(12) United States Patent
Sugiyama et al.

(10) Patent No.: US 7,497,482 B2
(45) Date of Patent: Mar. 3, 2009

(54) PIPE JOINT

(75) Inventors: Kazuhiko Sugiyama, Nirasaki (JP);
Keiko Hada, Nirasaki (JP); Eiji Ideta,
Osaka (JP); Nobukazu Ikeda, Osaka
(JP); Naofumi Yasumoto, Osaka (JP);
Michio Yamaji, Osaka (JP)

(73) Assignee: Fujikin Incorporated, Osaka-Shi (JP)

( * ) Notice: Subject to any disclaimer, the term of this patent is extended or adjusted under 35 U.S.C. 154(b) by 330 days.

(21) Appl. No.: 10/506,671

(22) PCT Filed: Mar. 19, 2003

(86) PCT No.: PCT/JP03/03293

§ 371 (c)(1),
(2), (4) Date: Apr. 7, 2005

(87) PCT Pub. No.: WO03/078884

PCT Pub. Date: Sep. 25, 2003

(65) Prior Publication Data

US 2005/0179259 A1    Aug. 18, 2005

(30) Foreign Application Priority Data

Mar. 20, 2002  (JP)  ............................. 2002-077990
Jan. 10, 2003  (JP)  ............................. 2003-004773

(51) Int. Cl.
*F16L 19/00* (2006.01)

(52) U.S. Cl. ...................... 285/353; 285/328; 285/354; 285/384; 285/386

(58) Field of Classification Search ................ 285/328, 285/353–354, 384, 386
See application file for complete search history.

(56) References Cited

U.S. PATENT DOCUMENTS

| | | | | |
|---|---|---|---|---|
| 2,726,104 A | * | 12/1955 | Boitnott et al. | ................ 285/98 |
| 5,066,051 A | * | 11/1991 | Weigl et al. | .................. 285/328 |
| 5,161,835 A | * | 11/1992 | Miyake | ...................... 285/322 |
| 5,645,301 A | | 7/1997 | Kingsford et al. | ............. 285/14 |
| 5,714,062 A | | 2/1998 | Winkler et al. | ............... 210/220 |
| 5,829,796 A | | 11/1998 | Robinson | ................. 285/288.1 |

FOREIGN PATENT DOCUMENTS

| | | |
|---|---|---|
| DE | 63 526 C | 8/1892 |
| DE | 90 11 722 U1 | 10/1990 |
| EP | 0 392 901 A1 | 10/1990 |
| EP | 0 396 151 A | 11/1990 |
| EP | 0 396 151 A2 | 11/1990 |
| FR | 2 217 625 A | 9/1974 |
| GB | 745 847 A | 3/1956 |

(Continued)

*Primary Examiner*—Aaron M Dunwoody
*Assistant Examiner*—Fannie Kee
(74) *Attorney, Agent, or Firm*—Kratz, Quintos & Hanson, LLP.

(57) ABSTRACT

A pipe joint comprises a first joint member of synthetic resin having an annular recessed portion in an end face thereof, and a second joint member of synthetic resin having an annular ridge on an end face thereof. The ridge is fitted in the opening of the recessed portion, with a synthetic resin gasket fitted in the recessed portion. When the pipe joint is properly tightened up, the outer surface of the ridge of the second joint member is pressed against the inner surface of the recessed portion of the first joint member with the gasket interposed therebetween in intimate contact with the surfaces approximately over the entire areas thereof.

18 Claims, 6 Drawing Sheets

FOREIGN PATENT DOCUMENTS

| | | |
|---|---|---|
| JP | 57-112162 | 7/1982 |
| JP | 112162/1982 | 7/1982 |
| JP | 62-106091 | 7/1987 |
| JP | 106091/1987 | 7/1987 |
| JP | 1-98393 | 6/1989 |
| JP | 98393/1989 | 6/1989 |
| JP | 1-158887 | 11/1989 |
| JP | 158887/1989 | 11/1989 |
| JP | 4-31801 | 3/1992 |
| JP | 31801/1992 | 3/1992 |
| JP | 4-102791 | 4/1992 |
| JP | 6-53886 | 7/1994 |
| JP | 53886/1994 | 7/1994 |
| JP | 6-241362 | 8/1994 |
| JP | 8-100875 | 4/1996 |
| JP | 8-128574 | 5/1996 |

* cited by examiner (a)

(b)

and joined to each other by screw means.
PIPE JOINT

TECHNICAL FIELD

The present invention relates to pipe joints, and more particularly to a pipe joint comprising joint members made of synthetic resin and joined to each other by screw means.

BACKGROUND ART

Generally used in fluid control devices, for example, for manufacturing semiconductors are pipe joints which comprise a pair of tubular joint members, an annular gasket interposed between the abutting end faces of the two joint members and screw means for joining the two joint members. With such pipe joints, the tubular joint members and the gasket are usually made of a metal, such as SUS316L or like stainless steel.

While various fluids are passed through conventional pipe joints of stainless steel in the process for manufacturing semiconductors, these fluids include those having properties to readily corrode metals, such as acidic ammonium fluoride, and it is desired to improve the joint. Although it appears feasible to make the members of the pipe joint from PFA or like synthetic resin, synthetic resin members undergo a greater alteration in shape (e.g. stress relaxation or cold flow) with time than metal members, and the specific pressure occurring between the members at the abutting portions gradually decreases, possibly resulting in leakage of the fluid.

An object of the present invention is to provide a pipe joint wherein the portions to be brought into contact with a fluid are made of a synthetic resin and which retains the ability to prevent fluid leaks despite the lapse of time.

DISCLOSURE OF THE INVENTION

The present invention provides as a first feature thereof a pipe joint comprising a first and a second tubular joint member of synthetic resin, a synthetic resin gasket interposed between abutting portions of the joint members and screw means for joining the joint members, the pipe joint being characterized in that the first joint member is provided in an abutting end face thereof with an annular recessed portion having an opening remaining therein with the gasket entirely fitted therein, the second joint member being provided with an annular ridge on an abutting end face thereof, the ridge being fitted in the opening of the recessed portion with the gasket fitted in the recessed portion, an outer surface of the ridge of the second joint member being pressed against an inner surface of the recessed portion of the first joint member with the gasket interposed between the surfaces in intimate contact therewith approximately over the entire surface areas when the pipe joint is properly tightened up, a portion of the abutting end face of the first joint member positioned radially inwardly of the recessed portion being then in intimate contact with a portion of the abutting end face of the second joint member positioned radially inwardly of the ridge approximately over the entire surface areas thereof, a portion of the abutting end face of the first joint member positioned radially outwardly of the recessed portion being then in intimate contact with a portion of the abutting end face of the second joint member positioned radially outwardly of the ridge approximately over the entire surface areas thereof.

The present invention provides as a second feature thereof a pipe joint comprising a first and a second tubular joint member of synthetic resin, and screw means for joining the joint members, the pipe joint being characterized in that the first joint member is provided with an annular recessed portion in an abutting end face thereof, the second joint member being provided with an annular ridge on an abutting end face thereof, the ridge of the second joint member being fitted in the recessed portion of the first joint member, with an outer surface of the ridge in intimate contact with an inner surface of the recessed portion approximately over the entire surface areas when the pipe joint is properly tightened up, a portion of the abutting end face of the first joint member positioned radially inwardly of the recessed portion being then in intimate contact with a portion of the abutting end face of the second joint member positioned radially inwardly of the ridge approximately over the entire surface areas thereof, a portion of the abutting end face of the first joint member positioned radially outwardly of the recessed portion being then in intimate contact with a portion of the abutting end face of the second joint member positioned radially outwardly of the ridge approximately over the entire surface areas thereof.

With the pipe joint according to the second feature of the invention, the ridge of the second joint member may comprise a portion formed integrally with the second joint member and a portion formed separately from the integral portion, the portion integral with the ridge of the first joint member being in intimate contact with the separate portion of the second joint member when the pipe joint is properly tightened up.

The present invention provides as a third feature thereof a pipe joint comprising a first and a second tubular joint member of synthetic resin, a synthetic resin gasket interposed between abutting portions of the joint members and screw means for joining the joint members, the pipe joint being characterized in that each of the joint members is provided in an abutting end face thereof with an annular recessed portion for forming a portion for accommodating the gasket therein when the joint members are butted against each other, the gasket being in intimate contact with an inner surface of the recessed portion of the first joint member approximately over the entire area thereof when the pipe joint is properly tightened up, a surface portion of the gasket exposed from the same recessed portion being then in intimate contact with an inner surface of the recessed portion of the second joint member approximately over the entire area thereof, a portion of the abutting end face of the first joint member positioned radially inwardly of the recessed portion thereof being then in intimate contact with a portion of the abutting end face of the second joint member positioned radially inwardly of the recessed portion thereof approximately over the entire surface areas thereof, a portion of the abutting end face of the first joint member positioned radially outwardly of the recessed portion thereof being then in intimate contact with a portion of the abutting end face of the second joint member positioned radially outwardly of the recessed portion thereof approximately over the entire surface areas thereof.

The first to third features of the invention provide pipe joints having sustained ability to prevent leaks of fluids despite the lapse of time although the portions thereof to be exposed to the fluid are made of synthetic resin. The pipe joint embodying the second feature of the invention further has the advantage of being reduced in the number of components, while the pipe joint according to the third feature of the invention has the advantage that the gasket is easily removable in disassembling the pipe joint.

The pipe joint according to the third feature of the invention may be so designed that the portion of the abutting end face of the first joint member positioned radially inwardly of the recessed portion thereof axially projects beyond the radially outward portion thereof, and that the portion of the abutting end face of the second joint member positioned radially inwardly of the recessed portion thereof also axially projects beyond the radially outward portion thereof. The portion of the abutting end face of the first joint member positioned radially inwardly of the recessed portion thereof may be flush with the bottom surface of the recessed portion thereof, the radially outward portion of the first joint member axially projecting beyond the bottom surface of the recessed portion thereof, the portion of the abutting end face of the second joint member radially inward of the recessed portion thereof axially projecting beyond the bottom surface of the recessed portion thereof, the radially outward portion of the second joint member being axially recessed from the bottom surface of the recessed portion thereof. Furthermore, the portion of the abutting end face of the first joint member positioned radially inwardly of the recessed portion thereof may be recessed from the bottom surface of the recessed portion thereof, the radially outward portion of the first joint member axially projecting beyond the bottom surface of the recessed portion thereof, the portion of the abutting end face of the second joint member radially inward of the recessed portion thereof axially projecting beyond the bottom surface of the recessed portion thereof, the radially outward portion of the second joint member being axially recessed from the bottom surface of the recessed portion thereof.

The pipe joint according to each of the features of the invention is preferably so designed that when the pipe joint is manually tightened up, a first gap is present between the portion of the abutting end face of the first joint member positioned radially inwardly of the recessed portion thereof and the portion of the abutting end face of the second joint member positioned radially inwardly of the ridge or the recessed portion thereof, a second gap greater than the first gap being present between the portion of the abutting end face of the first joint member positioned radially outwardly of the recessed portion thereof and the portion of the abutting end face of the second joint member positioned radially outwardly of the ridge or the recessed portion thereof. When thus constructed, the pipe joint has portions of great specific pressure, portions of medium specific pressure and portion of small specific pressure. During the first half of the period of use, a reduced pressure occurs at the portions of great specific pressure, whereas the pressure drop is suppressed at the portions of medium specific pressure during this period. This enables the pipe joint to retain fluid leak preventing ability over a prolonged period of time.

The first gap is preferably at least 0.1 mm to not greater than 0.4 mm, more preferably at least 0.15 mm to not greater than 0.3 mm. The second gap is preferably at least 0.2 mm to not greater than 0.6 mm, more preferably at least 0.25 mm to not greater than 0.5 mm. The difference between the second gap and the first gap is preferably at least 0.05 mm to not greater than 0.3 mm, more preferably at least 0.1 mm to not greater than 0.2 mm.

In the pipe joint according to each of the features of the invention, each of the joint members may be provided at the abutting end face thereof with a flange portion, the screw means comprising an annular male screw member having a forward end face in bearing contact with the flange portion of one of the joint members, and a cap nut fitted around the other joint member and having a top wall in bearing contact with the flange portion of said other joint member, the cap nut being screwed on the male screw member. The male screw member and the cap nut which are held out of contact with the fluid flowing through the joint members, may therefore be made of a metal or can of course be made of a synthetic resin. The flange portions of the joint members are pressed axially inward by tightening up the cap nut on the male screw member, whereby the two joint members are joined fluid-tightly.

In each of the pipe joints according to the features of the invention, at least one of a space between the male screw member and the flange portion of said one joint member and a space between the top wall of the cap nut and the flange portion of said other flange member may have disposed therein a biasing member for biasing one of the joint members toward the other joint member. An annular clearance may be formed inside the cap nut around the flange portions of the joint members and may have an annular spacer disposed therein, at least one of a space between the cap nut top wall and the spacer and a space between the male screw member and the spacer having a biasing member provided therein for biasing one of the joint members toward the other joint member. Even if the joint members and the gasket which are made of synthetic resin undergo an alteration (e.g., stress relaxation or cold flow) with time, a specific pressure greatly influencing the ability to prevent fluid leaks can then be maintained to ensure more reliable fluid leak preventing performance because one of the joint members is biased toward the other joint member at all times.

Preferably, a synthetic resin thrust ring is interposed between the cap nut top wall and the flange portion of the joint member. As the cap nut is rotated for tightening up, the thrust ring then comes into sliding contact with the cap nut and the joint member, preventing the cap nut and the joint member from rotating together.

In this case, the thrust ring may have an outside diameter larger than the inside diameter of the cap nut, with an annular recess formed in an inner periphery of the cap nut for accommodating an outer peripheral edge of the thrust ring.

The thickness of the thrust ring is preferably equal to or smaller than the thickness of the gasket and is preferably as small as possible from the viewpoint of stress relaxation.

Examples of synthetic resins useful for making the joint members are fluorocarbon resins such as PFA. Examples of synthetic resins useful for making the gasket are fluorocarbon resins such as PTFE. Also useful are other fluorocarbon resins, such as FEP, PCTFE and ETFE, and other synthetic resins. The joint members and the gasket may be made from the same material. The synthetic resin for making the thrust ring is, for example, the same as the material for the gasket, and may be a resin smaller than the gasket material in coefficient of sliding friction (more smoothly slidable).

BEST MODE OF CARRYING OUT THE INVENTION

Embodiments of the present invention will be described below with reference to the drawings.

Figure 1:
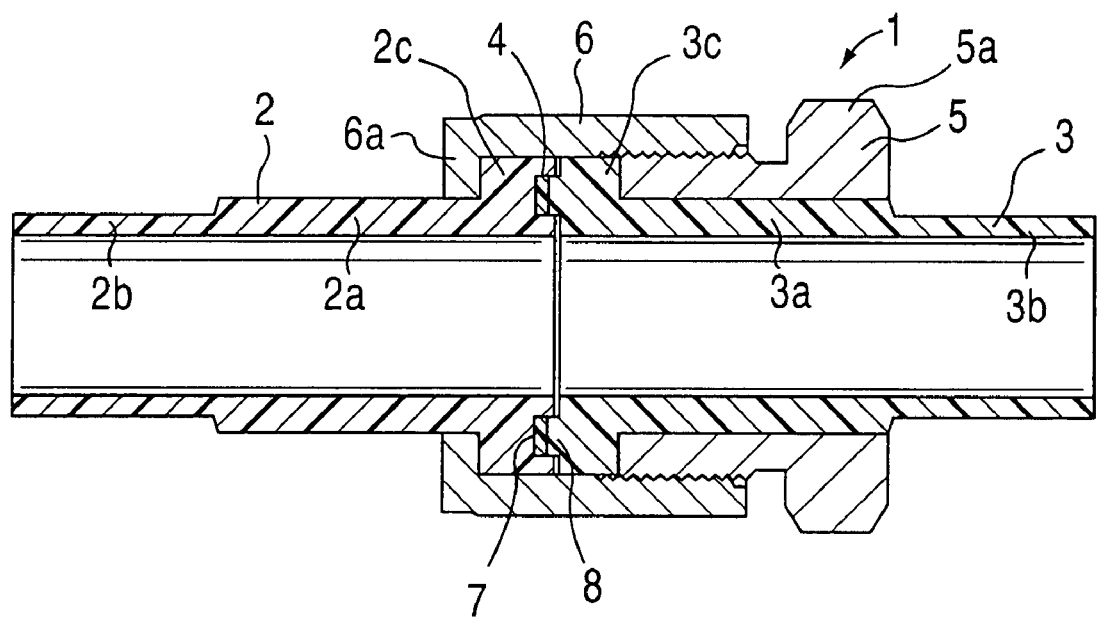
FIG. 1 is a view in longitudinal section showing a first embodiment of pipe joint according to a first feature of the invention.
Figure 2:
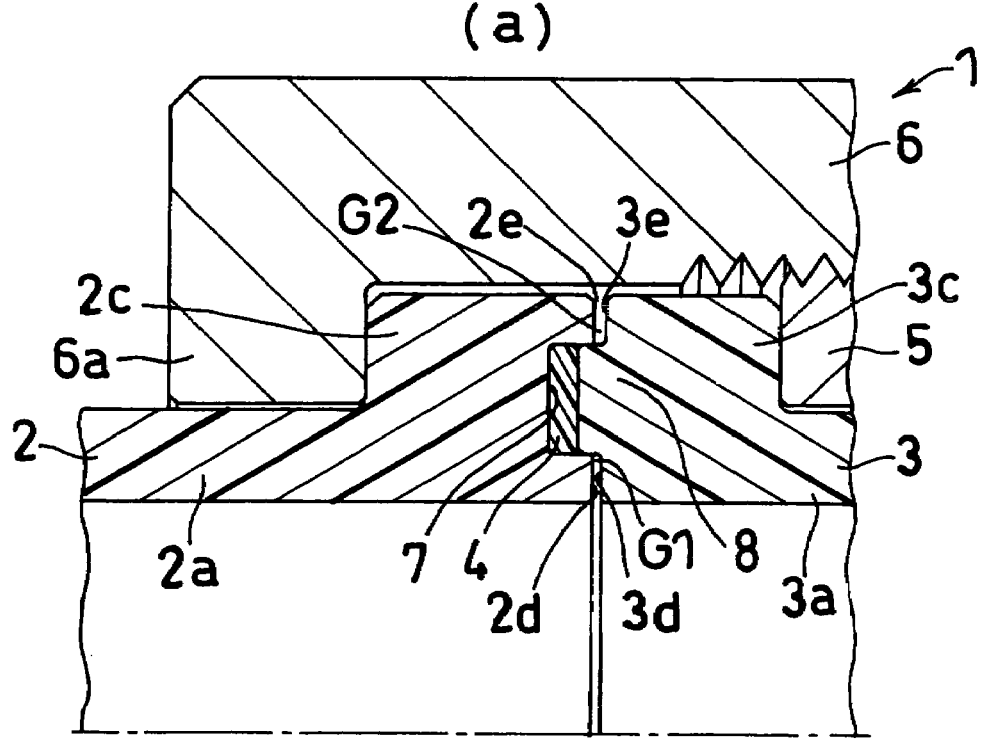
FIG. 2 includes enlarged fragmentary views in longitudinal section of the same, (a) showing the joint as tightened up manually, (b) showing the joint as tightened up properly.
Figure 2:
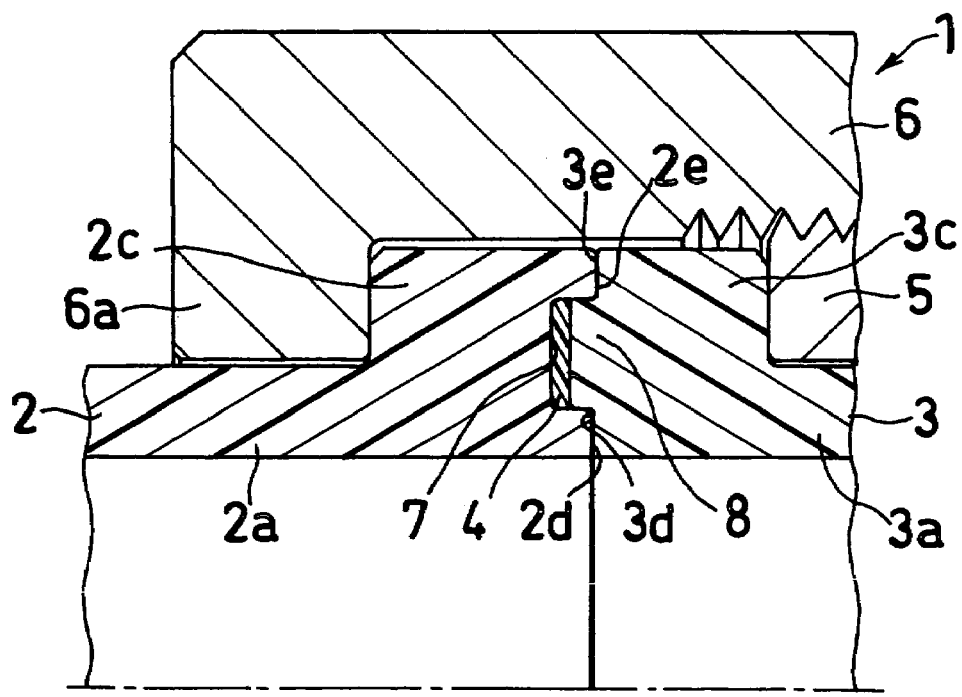

FIGS. 1 and 2 show a pipe joint embodying a first feature of the invention. With reference to FIG. 1, the pipe joint 1 comprises a first tubular joint member 2 of synthetic resin, a second tubular joint member 3 of synthetic resin, a synthetic resin annular gasket 4 having a rectangular cross section and interposed between abutting portions of the two joint members 2, 3, an annular male screw member 5 fitted around the second joint member 3, and a cap nut 6 fitted around the first joint member 2 and screwed on the male screw member 5.

The joint members 2, 3 are equal in inside diameter, each have a predetermined inside diameter over the entire length, and comprise thick wall portions 2a, 3a closer to the abutting portions, thin wall portions 2b, 3b remote from the abutting portions and flange portions 2c, 3c formed at the abutting ends of the thick wall portions 2a, 3a, respectively.

The first joint member 2 has an annular recessed portion 7 rectangular in cross section and formed in a radially intermediate portion of the abutting end face thereof. The second joint member 3 has an annular ridge 8 rectangular in cross section and formed on a radially intermediate portion of the abutting end face thereof.

The male screw member 5 and the cap nut 6 are made of metal. A flange portion 5a in the form of a hexagonal prism is formed on the male screw member 5 at an end thereof opposite to the abutting portion. The cap nut has a top wall 6a in the form of a bored disk and formed at an end thereof opposite to the abutting portion. The male screw member 5 has an inside diameter approximately equal to the outside diameter of thick wall portion 3a of the second joint member 3. The top wall 6a of the cap nut 6 has an inside diameter approximately equal to the outside diameter of thick wall portion 2a of the first joint member 2. As the cap nut 6 is tightened on the male screw member 5, the male screw member 5 pushes the flange portion 3c of the second joint member 3 axially inward, while the cap nut 6 pushes the flange portion 2c of the first joint member 2 axially inward, whereby the two joint members 2, 3 are brought into intimate contact with each other, with the gasket 4 interposed therebetween.

The recessed portion 7 of the first joint member 2, the ridge 8 of the second joint member 3 and the gasket 4 are approximately equal in inside diameter. The recessed portion 7 of the first joint member 2, the ridge 8 of the second joint member 3 and the gasket 4 are also approximately equal in outside diameter. The depth of the recessed portion 7 is greater than the amount of projection of the ridge 8, and the thickness of the gasket 4 is smaller than the depth of the recessed portion 7. The depth of the recessed portion 7 is slightly smaller than the sum of the amount of projection of the ridge 8 and the thickness of the gasket 4.

FIG. 2(a) shows the cap nut 6 as manually tightened up on the male screw member 5, and FIG. 2(b) shows the cap nut as further tightened up properly from this state using a wrench or the like.

When the pipe joint 1 is in the manually tightened state, the gasket 4 is fitted in its entirety in the recessed portion 7 of the first joint member 2, with the ridge 8 of the second joint member 3 pressing the gasket 4 against the bottom surface of the recessed portion 7, as shown in FIG. 2(a). A first gap G1 is present between the portion 2d of the abutting end face of the first joint member 2 which is positioned radially inwardly of the recessed portion 7 and the portion 3d of the abutting end face of the second joint member 3 which is positioned radially inwardly of the ridge 8. A second gap G2 greater than the first gap G1 is present between the portion 2e of the abutting end face of the first joint member 2 which is positioned radially outwardly of the recessed portion 7 and the portion 3e of the abutting end face of the second joint member 3 which is positioned radially outwardly of the ridge 8. Examples of dimensions of these portions are as follows. The portion 2d radially inward of the recessed portion 7 of the first joint member 2 is flush with the portion 2e radially outward thereof, the depth of the recessed portion 7 is 1.5 mm, the portion 3d radially inward of the ridge 8 of the second joint member 3 axially projects by 0.2 mm beyond the portion 3e radially outward thereof, the amount of projection of the ridge 8 is 0.8 mm based on the radially inward portion 3d, the gasket 4 is 1 mm in thickness, the first gap G1 is 0.3 mm, and the second gap G2 is 0.5 mm.

With reference to FIG. 2(b) showing the pipe joint 1 as properly tightened up, the gasket 4 and the ridge 8 of the second joint member 3 are entirely fitted in the recessed portion 7 of the first joint member 2, the outer surface of the ridge 8 of the second joint member 3 is pressed against the inner surface of the recessed portion 7 of the first joint member 2 with the gasket 4 interposed therebetween while holding intimate contact with one another approximately over the entire opposed surfaces, the radially inward portion 2d of the first joint member abutting end face is in intimate contact with the radial inward portion 3d of the second joint member abutting end face approximately over the entire opposed faces thereof, and the radial inward portion 2e of the first joint member abutting end face is also in intimate contact with the radially inward portion 3e of the second joint member abutting end face approximately over the entire opposed faces thereof.

Figure 3:
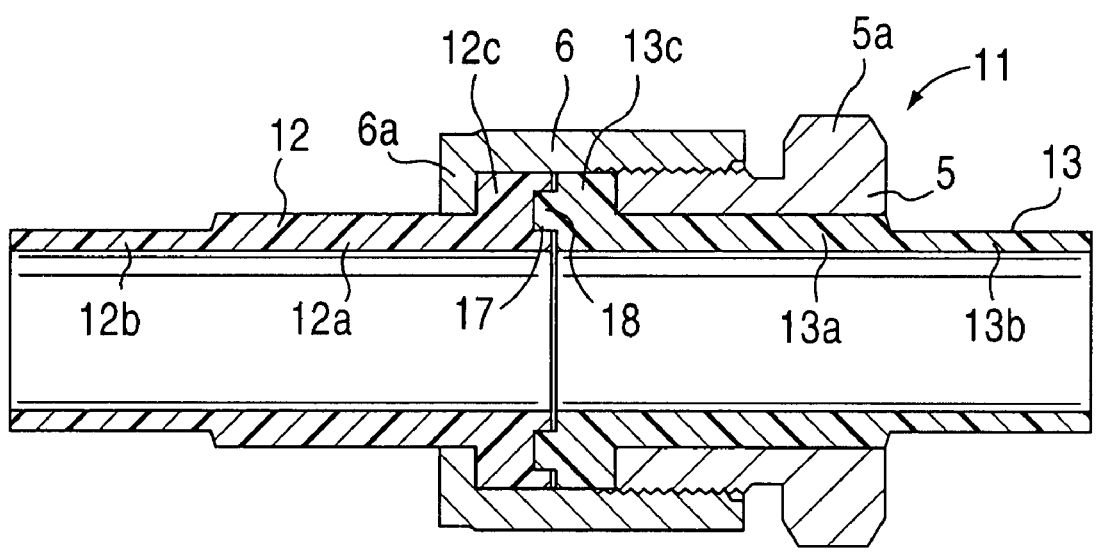
FIG. 3 is a view in longitudinal section showing an embodiment of pipe joint according to a second feature of the invention.
Figure 4:
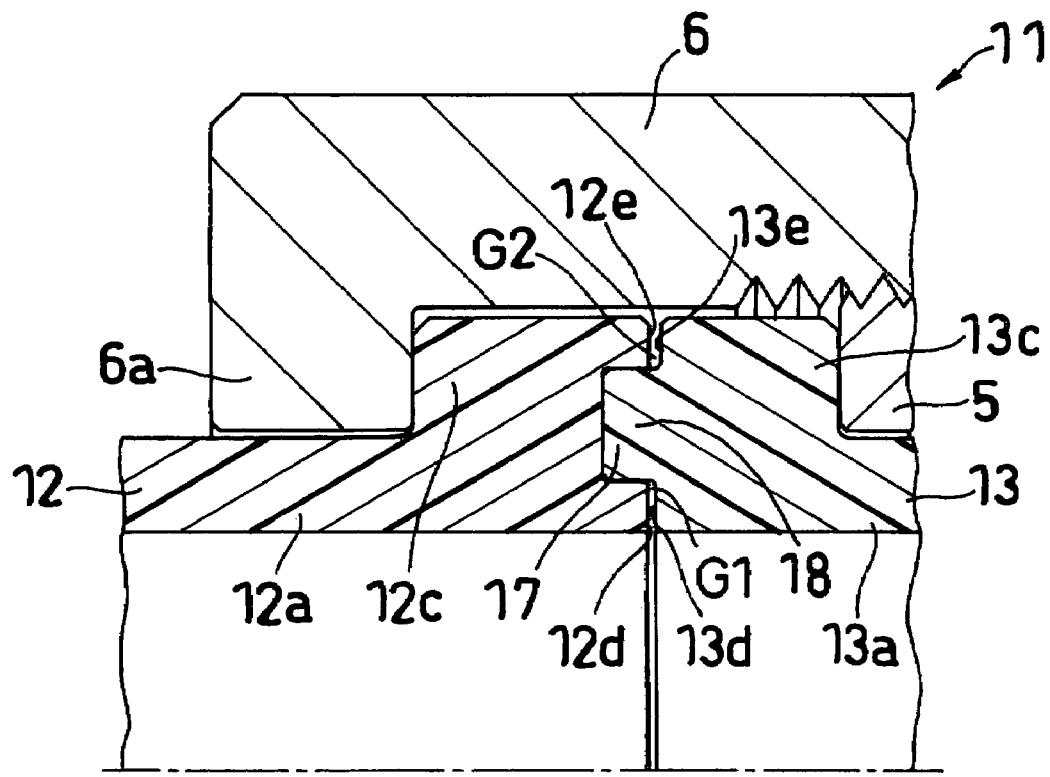
FIG. 4 is an enlarged fragmentary view in longitudinal section of FIG. 3.

FIGS. 3 and 4 show a pipe joint embodying a second feature of the invention. With reference to FIG. 3, the pipe joint 11 comprises a first tubular joint member 12 of synthetic resin, a second tubular joint member 13 of synthetic resin, an annular male screw member 5 fitted around the second joint member 13, and a cap nut 6 fitted around the first joint member 12 and screwed on the male screw member 5.

The joint members 12, 13 are equal in inside diameter, each have a predetermined inside diameter over the entire length, and comprise thick wall portions 12a, 13a closer to abutting portions, thin wall portions 12b, 13b remote from the abutting portions and flange portions 12c, 13c formed at the abutting ends of the thick wall portions 12a, 13a, respectively.

The first joint member 12 has an annular recessed portion 17 rectangular in cross section and formed in a radially intermediate portion of the abutting end face thereof. The second joint member 13 has an annular ridge 18 rectangular in cross section and formed on a radially intermediate portion of the abutting end face thereof.

The male screw member 5 and the cap nut 6 are made of metal. A flange portion 5a in the form of a hexagonal prism is formed on the male screw member 5 at an end thereof opposite to the abutting portion. The cap nut has a top wall 6a in the form of a bored disk and formed at an end thereof opposite to the abutting portion. The male screw member 5 has an inside diameter approximately equal to the outside diameter of thick wall portion 13a of the second joint member 13. The top wall 6a of the cap nut 6 has an inside diameter approximately equal to the outside diameter of thick wall portion 12a of the first joint member 12. As the cap nut 6 is tightened on the male screw member 5, the male screw member 5 pushes the flange portion 13c of the second joint member 13 axially inward, while the cap nut 6 pushes the flange portion 12c of the first joint member 12 axially inward, whereby the two joint members 12, 13 are brought into intimate contact with each other with the ridge 18 fitting in the recessed portion 17.

The recessed portion 17 of the first joint member 12 and the ridge 18 of the second joint member 13 are approximately equal in inside diameter. The recessed portion 17 of the first joint member 12 and the ridge 18 of the second joint member 13 are also approximately equal in outside diameter. The depth of the recessed portion 17 is smaller than the amount of projection of the ridge 18.

FIG. 4 shows the cap nut 6 as manually tightened up on the male screw member 5. When the pipe joint 11 is in the manually tightened state, the ridge 18 of the second joint member 13 is fitted in the recessed portion 17 of the first joint member 12, with the outer end face of the ridge 18 pressing against the bottom face of the recessed portion as shown in the drawing. A first gap G1 is present between the portion 12d of the abutting end face of the first joint member 12 which is positioned radially inwardly of the recessed portion 17 and the portion 13d of the abutting end face of the second joint member 13 which is positioned radially inwardly of the ridge 18. A second gap G2 greater than the first gap G1 is present between the portion 12e of the abutting end face of the first joint member 12 which is positioned radially outwardly of the recessed portion 17 and the portion 13e of the abutting end face of the second joint member 13 which is positioned radially outwardly of the ridge 18. Examples of dimensions of these portions are as follows. The portion 12d radially inward of the recessed portion 17 of the first joint member 12 is flush with the portion 12e radially outward thereof, the depth of the recessed portion 17 is 1.5 mm, the portion 13d radially inward of the ridge 18 of the second joint member 13 is axially projected by 0.2 mm beyond the radially outward portion 13e, the amount of projection of the ridge 18 is 1.8 mm based on the radially inward portion 13d, the first gap G1 is 0.3 mm, and the second gap G2 is 0.5 mm.

When the pipe joint 11 is properly tightened up as further tightened from the state of FIG. 4, the ridge 18 of the second joint member 13 is entirely fitted in the recessed portion 17 of the first joint member 12, the outer surface of the ridge 18 of the second joint member 13 is in intimate contact with the inner surface of the recessed portion 17 of the first joint member 12 approximately over the entire areas of the surfaces, the portion 12d of the abutting end face of the first joint member 12 which is positioned radially inwardly of the recessed portion 17 is in intimate contact with the portion 13d of the abutting end face of the second joint member 13 which is positioned radially inwardly of the ridge 18 approximately over the entire opposed faces thereof, and the portion 12e of the abutting end face of the first joint member 12 which is positioned radially outward of the recessed portion 17 is also in intimate contact with the portion 13e of abutting end face of the second joint member 13 which is positioned radially outward of the ridge 18 approximately over the entire opposed faces thereof.

Figure 5:
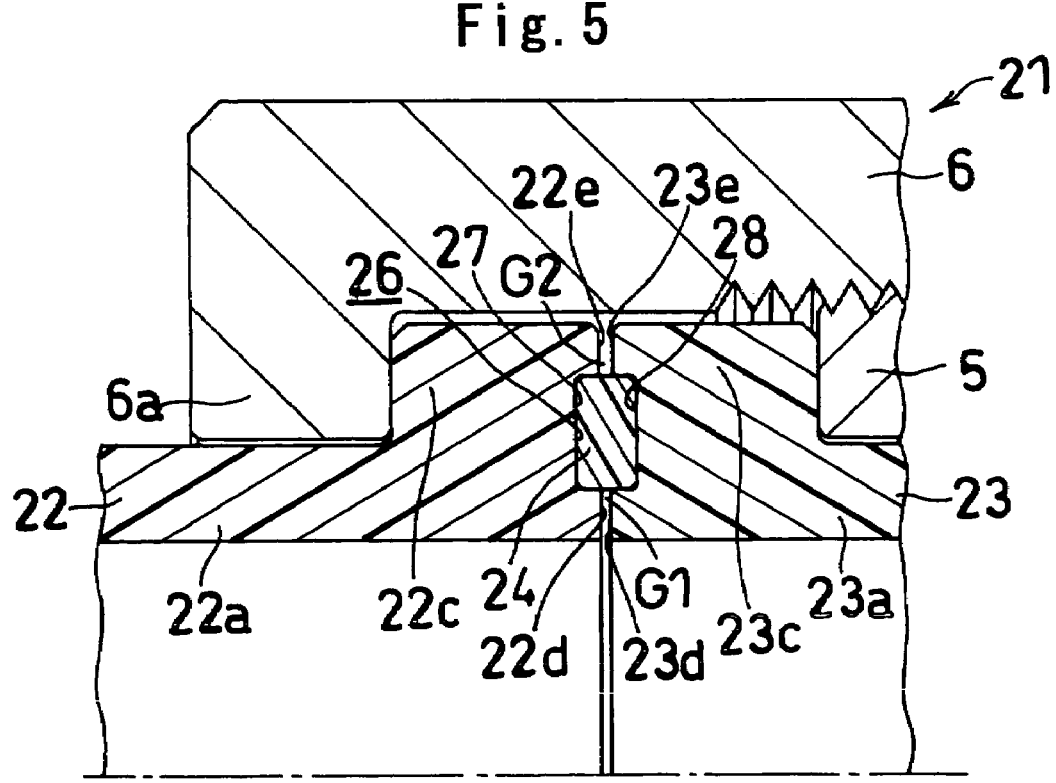
FIG. 5 is a view in longitudinal section showing a first embodiment of pipe joint according to a third feature of the invention.

FIG. 5 shows a first embodiment of a pipe joint according to a third feature of the invention. With reference to FIG. 5, the pipe joint 21 comprises a first tubular joint member 22 of synthetic resin, a second tubular joint member 23 of synthetic resin, a synthetic resin annular gasket 24 having a rectangular cross section and interposed between abutting portions of the two joint members 22, 23, an annular male screw member 5 fitted around the second joint member 23, and a cap nut 6 fitted around the first joint member 22 and screwed on the male screw member 5.

The joint members 22, 23 are equal in inside diameter, each have a predetermined inside diameter over the entire length, and comprise thick wall portions 22a, 23a closer to the abutting portions, thin wall portions (not shown) remote from the abutting portions and flange portions 22c, 23c formed at the abutting ends of the thick wall portions 22a, 23a, respectively.

The first joint member 22 has an annular recessed portion 27 rectangular in cross section and formed in a radially intermediate portion of the abutting end face thereof. The second joint member 23 has an annular recessed portion 28 rectangular in cross section and formed in a radially intermediate portion of the abutting end face thereof. The portion 22d of the abutting end face of the first joint member 22 which is positioned radially inwardly of the recessed portion 27 is slightly axially projected beyond the portion 22e of the abutting end face positioned radially outwardly of the portion 27. The portion 23d of the abutting end face of the second joint member 23 which is positioned radially inwardly of the recessed portion 28 is also slightly axially projected beyond the portion 23e of the abutting end face positioned radially outwardly of the portion 28. The two recessed portions 27, 28 provide a portion 26 for accommodating the gasket 24 therein when the joint members 22, 23 are butted against each other.

The male screw member 5 and the cap nut 6 are made of metal. A flange portion 5a in the form of a hexagonal prism is formed on the male screw member 5 at an end thereof opposite to the abutting portion. The cap nut has a top wall 6a in the form of a bored disk and formed at an end thereof opposite to the abutting portion. The male screw member 5 has an inside diameter approximately equal to the outside diameter of thick wall portion 23a of the second joint member 23. The top wall 6a of the cap nut 6 has an inside diameter approximately equal to the outside diameter of thick wall portion 22a of the first joint member 22. As the cap nut 6 is tightened on the male screw member 5, the male screw member 5 pushes the flange portion 23c of the second joint member 23 axially inward, while the cap nut 6 pushes the flange portion 22c of the first joint member 22 axially inward, whereby the two joint members 22, 23 are brought into intimate contact with each other with the gasket 24 interposed therebetween.

The recessed portion 27 of the first joint member 22, the recessed portion 28 of the second joint member 23 and the gasket 24 are approximately equal in inside diameter. The recessed portion 27 of the first joint member 22, the recessed portion 28 of the second joint member 23 and the gasket 24 are also approximately equal in outside diameter. The sum of the depths of the two recessed portions 27, 28 based on the radially inward portions 22d, 23d of the joint members 22, 23 is slightly smaller than the thickness of the gasket 24.

FIG. 5 shows the cap nut 6 as manually tightened up on the male screw member 5. In this manually tightened state of the pipe joint 21, approximately half of the gasket 24 is fitted in the recessed portion 27 of the first joint member 22, and the remaining approximate half of the gasket 24 in the recessed portion 28 of the second joint member 23. The gasket 24 is held in pressing contact with the bottom surface of the recessed portion 27 of the member 22 and the bottom surface of the recessed portion 28 of the member 23. A first gap G1 is present between the portion 22d of the abutting end face of the first joint member 22 which is positioned radially inwardly of the recessed portion 27 and the portion 23d of the abutting end face of the second joint member 23 which is positioned radially inwardly of the recessed portion 28. A second gap G2 greater than the first gap G1 is present between the portion 22e of the abutting end face of the first joint member 22 which is positioned radially outwardly of the recessed portion 27 and the portion 23e of the abutting end face of the second joint member 23 which is positioned radially outwardly of the recessed portion 28. Examples of dimensions of these portions are as follows. The portions 22d, 23d of the joint members 22, 23 radially inward of the recessed portions 27, 28 thereof axially project by 0.1 mm beyond the radially outward portions 22e, 23e, respectively. The depths of the recessed portions 27, 28 are 1.15 mm based on the respective radially inward portions 22d, 23d. The gasket 24 is 2 mm in thickness, the first gap G1 is 0.3 mm and the second gap G2 is 0.5 mm.

When the pipe joint is further tightened from the state of FIG. 5, the portion 22d of the abutting end face of the first joint member 22 which is positioned radially inwardly of the recessed portion 27 is first brought into intimate contact with the portion 23d of the abutting end face of the second joint member 23 which is positioned radially inwardly of the recessed portion 28 approximately over the entire opposed faces thereof. In the state of the joint as properly tightened up by further tightening, the gasket 24 is entirely fitted in the gasket accommodating recessed portion 26 formed by the recessed portion 27 of the first joint member 22 and the recessed portion 28 of the second joint member 23, the gasket 24 is in intimate contact with the inner surface of the recessed portion 27 of the member 22 approximately over the entire area thereof, the surface of the gasket 24 exposed from the recessed portion 27 is in intimate contact with the inner surface of the recessed portion 28 of the member 23 approximately over the entire area thereof, and the portion 22e of the abutting end face of the first joint member 22 which is positioned radially outwardly of the recessed portion 27 is also in intimate contact with the portion 23e of the abutting end face of the second joint member 23 which is positioned radially outwardly of the recessed portion 28 approximately over the entire opposed faces thereof.

Figure 6:
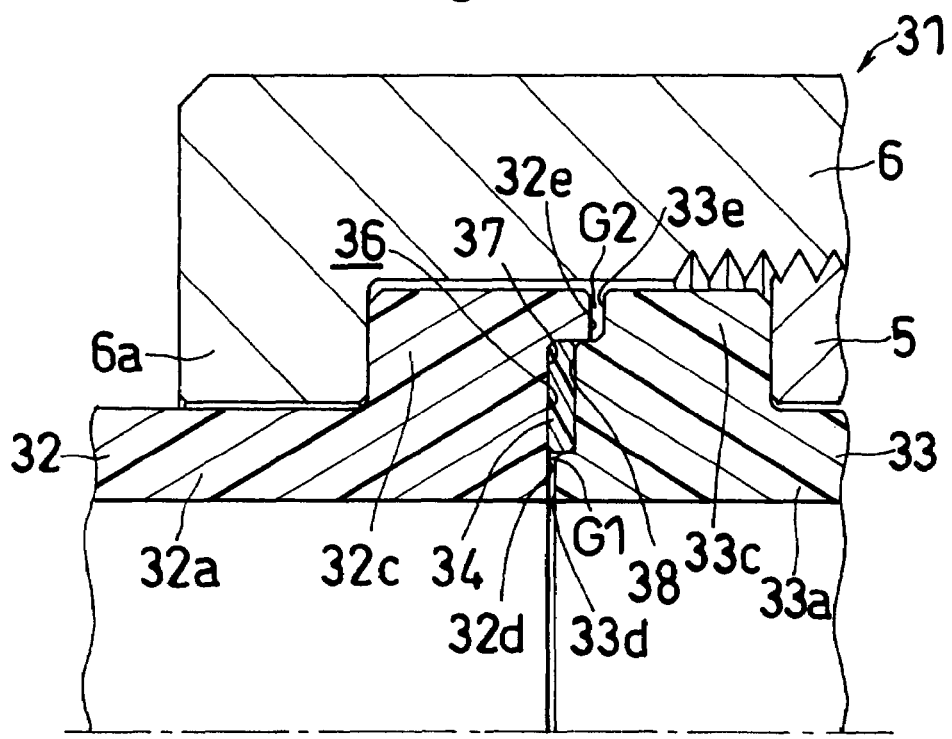
FIG. 6 is a view in longitudinal section showing a second embodiment of pipe joint according to the third feature of the invention.

FIG. 6 shows a second embodiment of a pipe joint according to the third feature of the invention. With reference to FIG. 6, the pipe joint 31 comprises a first tubular joint member 32 of synthetic resin, a second tubular joint member 33 of synthetic resin, a synthetic resin annular gasket 34 having a rectangular cross section and interposed between abutting portions of the two joint members 32, 33, an annular male screw member 5 fitted around the second joint member 33, and a cap nut 6 fitted around the first joint member 32 and screwed on the male screw member 5.

The joint members 32, 33 are equal in inside diameter, each have a predetermined inside diameter over the entire length, and comprise thick wall portions 32a, 33a closer to the abutting portions, thin wall portions (not shown) remote from the abutting portions and flange portions 32c, 33c formed at the abutting ends of the thick wall portions 32a, 33a, respectively.

The first joint member 32 has an annular recessed portion 37 rectangular in cross section and formed in a radially intermediate portion of the abutting end face thereof. The second joint member 33 has an annular recessed portion 38 rectangular in cross section and formed in a radially intermediate portion of the abutting end face thereof. The abutting end face of the first joint member 32 has a portion 32d positioned radially inwardly of the recessed portion 37 thereof and flush with the bottom surface of the recessed portion 37, and a portion 32e positioned radially outwardly of the recessed portion 37 and axially projecting beyond the bottom surface of the recessed portion 37. The abutting end face of the second joint member 33 has a portion 33d positioned radially inwardly of the recessed portion 38 thereof and axially projecting beyond the bottom surface of the recessed portion 38, and a portion 33e positioned radially outwardly of the recessed portion 38 and axially recessed from the bottom surface of the recessed portion 38. The two recessed portions 37, 38, the radially outward portion 32e of the first joint member 32 and the radially inward portion 33d of the second joint member 33 provide a portion 36 for accommodating the gasket 34 therein when the joint members 32, 33 are butted against each other.

The male screw member 5 and the cap nut 6 are made of metal. A flange portion 5a in the form of a hexagonal prism is formed on the male screw member 5 at an end thereof opposite to the abutting portion. The cap nut has a top wall 6a in the form of a bored disk and formed at an end thereof opposite to the abutting portion. The male screw member 5 has an inside diameter approximately equal to the outside diameter of thick wall portion 33a of the second joint member 33. The top Wall 6a of the cap nut 6 has an inside diameter approximately equal to the outside diameter of thick wall portion 32a of the first joint member 32. As the cap nut 6 is tightened on the male screw member 5, the male screw member 5 pushes the flange portion 33c of the second joint member 33 axially inward, while the cap nut 6 pushes the flange portion 32c of the first joint member 32 axially inward, whereby the two joint members 32, 33 are brought into intimate contact with each other with the gasket 34 interposed therebetween.

The recessed portion 37 of the first joint member 32, the recessed portion 38 of the second joint member 33 and the gasket 34 are approximately equal in inside diameter. The recessed portion 37 of the first joint member 32, the recessed portion 38 of the second joint member 33 and the gasket 34 are also approximately equal in outside diameter. The depth of the recessed portion 37 of the first joint member 32 is slightly larger than the thickness of the gasket 34, and the depth of the recessed portion 38 of the second joint members 33 is slightly smaller than the thickness of the gasket 34.

FIG. 6 shows the cap nut 6 as manually tightened up on the male screw member 5. In this manually tightened state of the pipe joint 31, the gasket 34 is entirely fitted in the gasket accommodating portion 36, and held in pressing contact with the bottom surface of the recessed portion 37 of the member 32 and the bottom surface of the recessed portion 38 of the member 33. A first gap G1 is present between the portion 32d of the abutting end face of the first joint member 32 which is positioned radially inwardly of the recessed portion 37 and the portion 33d of the abutting end face of the second joint member 33 which is positioned radially inwardly of the recessed portion 38. A second gap G2 greater than the first gap G1 is present between the portion 32e of the abutting end face of the first joint member 32 which is positioned radially outwardly of the recessed portion 37 and the portion 33e of the abutting end face of the second joint member 33 which is positioned radially outwardly of the recessed portion 38. Examples of dimensions of these portions are as follows. The radially outward portions 32e of the first joint member 32 projects beyond the bottom surface of the recessed portion 37 by 1.5 mm, the radially inward portions 33*d* of the second joint member 33 projects beyond the bottom surface of the recessed portion 38 by 0.7 mm, the radially outward portion 33*e* of the second joint member 33 is recessed from the bottom surface of the recessed portion 38 by 1 mm, the gasket 34 is 1 mm in thickness, the first gap G1 is 0.3 mm and the second gap G2 is 0.5 mm.

When the pipe joint is further tightened from the state of FIG. 6, the radially inward portion 32*d* of the first joint member abutting end face is first brought into intimate contact with the radially inward portion 33*d* of the second joint member abutting end face approximately over the entire opposed faces thereof. In the state of the pipe joint 31 as properly tightened up by further tightening, the gasket 34 is entirely fitted in the gasket accommodating recessed portion 36 by the recessed portions 37, 38, the radially outward portion 32*e* of the first joint member 32 and the radially inward portion 33*d* of the second joint member 33, with the outer surface of the gasket 34 in intimate contact with the inner surface of the accommodating recessed portion 36 approximately over the entire area thereof, and the radially outward portion 32*e* of the first joint member abutting end face is also in intimate contact with the radially outward portion 33*e* of the second joint member abutting end face approximately over the entire opposed faces thereof.

Figure 7:
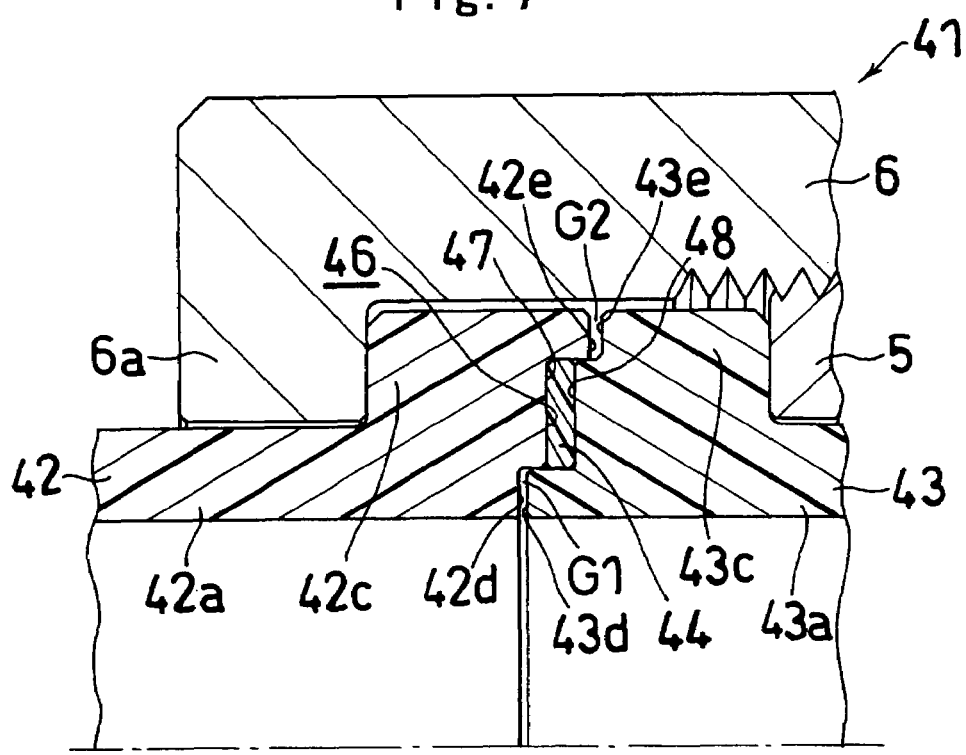
FIG. 7 is a view in longitudinal section showing a third embodiment of pipe joint according to the third feature of the invention.

FIG. 7 shows a third embodiment of a pipe joint according to the third feature of the invention. With reference to FIG. 7, the pipe joint 41 comprises a first tubular joint member 42 of synthetic resin, a second tubular joint member 43 of synthetic resin, a synthetic resin annular gasket 44 having a rectangular cross section and interposed between abutting portions of the two joint members 42, 43, an annular male screw member 5 fitted around the second joint member 43, and a cap nut 6 fitted around the first joint member 42 and screwed on the male screw member 5.

The joint members 42, 43 are equal in inside diameter, each have a predetermined inside diameter over the entire length, and comprise thick wall portions 42*a*, 43*a* closer to the abutting portions, thin wall portions (not shown) remote from the abutting portions and flange portions 42*c*, 43*c* formed at the abutting ends of the thick wall portions 32*a*, 33*a*, respectively.

The first joint member 42 has an annular recessed portion 47 rectangular in cross section and formed in a radially intermediate portion of the abutting end face thereof. The second joint member 43 also has an annular recessed portion 48 rectangular in cross section and formed in a radially intermediate portion of the abutting end face thereof. The abutting end face of the first joint member 42 has a portion 42*d* positioned radially inwardly of the recessed portion 47 thereof and further recessed from the bottom surface of the recessed portion 47, and a portion 42*e* positioned radially outwardly of the recessed portion 47 and axially projecting beyond the bottom surface of the recessed portion 47. The abutting end face of the second joint member 43 has a portion 43*d* positioned radially inwardly of the recessed portion 48 thereof and axially projecting beyond the bottom surface of the recessed portion 48, and a portion 43*e* positioned radially outwardly of the recessed portion 48 and axially recessed from the bottom surface of the recessed portion 48. The two recessed portions 47, 48, the radially outward portion 42*e* of the first joint member 42 and the radially inward portion 43*d* of the second joint member 43 provide a portion 46 for accommodating the gasket 44 therein when the joint members 42, 43 are butted against each other.

The male screw member 5 and the cap nut 6 are made of metal. A flange portion 5*a* in the form of a hexagonal prism is formed on the male screw member 5 at an end thereof opposite to the abutting portion. The cap nut has a top wall 6*a* in the form of a bored disk and formed at an end thereof opposite to the abutting portion. The male screw member 5 has an inside diameter approximately equal to the outside diameter of thick wall portion 43*a* of the second joint member 43. The top wall 6*a* of the cap nut 6 has an inside diameter approximately equal to the outside diameter of thick wall portion 42*a* of the first joint member 42. As the cap nut 6 is tightened on the male screw member 5, the male screw member 5 pushes the flange portion 43*c* of the second joint member 43 axially inward, while the cap nut 6 pushes the flange portion 42*c* of the first joint member 42 axially inward, whereby the two joint members 42, 43 are brought into intimate contact with each other with the gasket 44 interposed therebetween.

The recessed portion 47 of the first joint member 42, the recessed portion 48 of the second joint member 43 and the gasket 44 are approximately equal in inside diameter. The recessed portion 47 of the first joint member 42, the recessed portion 48 of the second joint member 43 and the gasket 44 are also approximately equal in outside diameter. The depth of the recessed portion 47 of the first joint member 42 is slightly larger than the thickness of the gasket 44, and the depth of the recessed portion 48 of the second joint members 43 is also slightly larger than the thickness of the gasket 44.

FIG. 7 shows the cap nut 6 as manually tightened up on the male screw member 5. In this manually tightened state of the pipe joint 41, the gasket 44 is entirely fitted in the gasket accommodating portion 46, and held in pressing contact with the bottom surface of the recessed portion 47 of the member 42 and the bottom surface of the recessed portion 48 of the member 43. A first gap G1 is present between the portion 42*d* of the abutting end face of the first joint member 32 which is positioned radially inwardly of the recessed portion 47 and the portion 43*d* of the abutting end face of the second joint member 33 which is positioned radially inwardly of the recessed portion 48. A second gap G2 greater than the first gap G1 is present between the portion 42*e* of the abutting end face of the first joint member 42 which is positioned radially outwardly of the recessed portion 47 and the portion 43*e* of the abutting end face of the second joint member 43 which is positioned radially outwardly of the recessed portion 48. Examples of dimensions of these portions are as follows. The radially outward portions 42*e* of the first joint member 42 projects beyond the bottom surface of the recessed portion 47 by 1.5 mm, the radially inward portions 42*d* of the first joint member 42 is recessed from the bottom surface of the recessed portion 47 by 0.8 mm, the radially inward portion 43*d* of the second joint member 43 projects beyond the bottom surface of the recessed portion 48 by 1.5 mm, the radially outward portion 43*e* of the second joint member 43 is recessed from the bottom surface of the recessed portion 48 by 1.0 mm, the gasket 44 is 1 mm in thickness, the first gap G1 is 0.3 mm and the second gap G2 is 0.5 mm.

When the pipe joint is further tightened from the state of FIG. 7, the radially inward portion 42*d* of the first joint member abutting end face is first brought into intimate contact with the radially inward portion 43*d* of the second joint member abutting end face approximately over the entire opposed faces thereof. In the state of the pipe joint 41 as properly tightened up by further tightening, the gasket 44 is entirely fitted in the gasket accommodating recessed portion 46 by the recessed portions 47, 48, the radially outward portion 42*e* of the first joint member 42 and the radially inward portion 43*d* of the second joint member 43, with the outer surface of the gasket 44 in intimate contact with the inner surface of the accommodating recessed portion 46 approximately over the entire area thereof, and the radially outward portion 42*e* of the first joint member abutting end face is also in intimate contact with the radially outward portion 43e of the second joint member abutting end face approximately over the entire opposed faces thereof.

Figure 8:
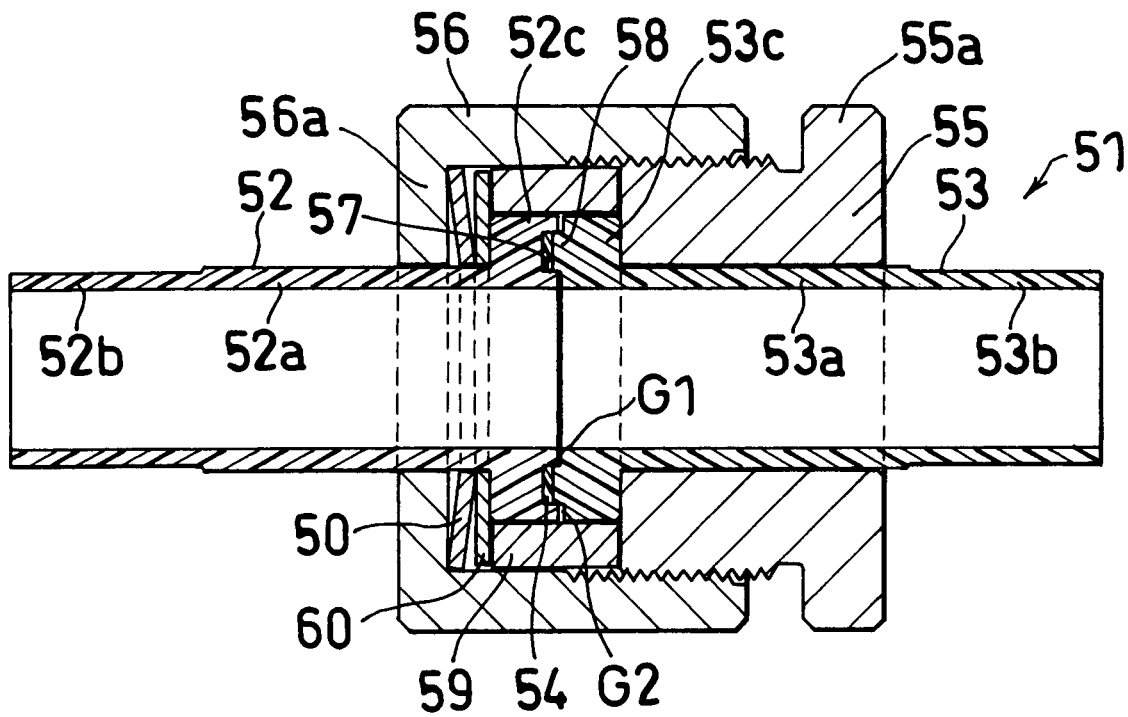
FIG. 8 is a view in longitudinal section showing another embodiment of pipe joint according to the first feature of the invention.

FIG. 8 shows another embodiment of a pipe joint according to the first feature of the invention. With reference to FIG. 8, the pipe joint 51 comprises a first tubular joint member 52 of synthetic resin, a second tubular joint member 53 of synthetic resin, a synthetic resin annular gasket 54 having a rectangular cross section and interposed between abutting portions of the two joint members 52, 53, an annular male screw member 55 fitted around the second joint member 53, and a cap nut 56 fitted around the first joint member 52 and screwed on the male screw member 55.

The joint members 52, 53 are equal in inside diameter, each have a predetermined inside diameter over the entire length, and comprise thick wall portions 52a, 53a closer to the abutting portions, thin wall portions 52b, 53b remote from the abutting portions and flange portions 52c, 53c formed at the abutting ends of the thick wall portions 52a, 53a, respectively.

The first joint member 52 has an annular recessed portion 57 rectangular in cross section and formed in a radially intermediate portion of the abutting end face thereof. The second joint member 53 has an annular ridge 58 rectangular in cross section and formed on a radially intermediate portion of the abutting end face thereof.

The male screw member 55 and the cap nut 56 are made of metal. A flange portion 55a in the form of a hexagonal prism is formed on the male screw member 55 at an end thereof opposite to the abutting portion. The cap nut 56 has a top wall 56a in the form of a bored disk and formed at an end thereof opposite to the abutting portion. The male screw member 55 has an inside diameter approximately equal to the outside diameter of thick wall portion 53a of the second joint member 53. The top wall 56a of the cap nut 56 has an inside diameter approximately equal to the outside diameter of thick wall portion 52a of the first joint member 52.

According to the present embodiment, the outside diameter of the male screw member 55 and the inside diameter of the cap nut 56 are greater than the outside diameter of the flange portions 52c, 53c of the joint members 52, 53, and a clearance is formed inside the cap nut 56 around the flange portions 52c, 53c of the joint members 52, 53. An annular spacer 59 is disposed in this clearance. Provided between the top wall of the cap nut 56, and the flange portion 52c of the first joint member 52 and the spacer 59 are an annular disk spring 50 and a spring washer 60 serving as members for biasing the joint member flange portion 52c toward the second joint member 53, with the spring washer 60 positioned closer to the flange portion 52c and the spacer 59. The spacer 59 has an axial length slightly smaller than the sum of the axial lengths of the flange portions 52c, 53c of the two joint members 52, 53.

When the cap nut 56 is tightened on the male screw member 55, the male screw member 55 pushes the flange portion 53c of the second joint member 53 axially inward, while the cap nut 56 pushes the flange portion 52c of the first joint member 52 axially inward through the disk spring 50 and the washer 60, whereby the two joint members 52, 53 are brought into intimate contact with each other with the gasket 54 interposed therebetween.

The recessed portion 57 of the first joint member 52, the ridge 58 of the second joint member 53 and the gasket 54 are approximately equal in inside diameter. The recessed portion 57 of the first joint member 52, the ridge 58 of the second joint member 53 and the gasket 54 are also approximately equal in outside diameter. The depth of the recessed portion 57 is greater than the amount of projection of the ridge 58, and the thickness of the gasket 54 is smaller than the depth of the recessed portion 57. The depth of the recessed portion 57 is slightly smaller than the sum of the amount of projection of the ridge 58 and the thickness of the gasket 54.

FIG. 8 shows the cap nut 56 as manually tightened up on the male screw member 55. The pipe joint 51 has the same construction as the embodiment shown in FIGS. 1 and 2 except for the spacer 59 and the biasing members 50, 60, so that a detailed description will not be given. When the pipe joint 51 is in the manually tightened state, the gasket 54 is entirely fitted in the recessed portion 57 of the first joint member 52, and pressed against the bottom surface of the recessed portion 57 by the ridge 58 of the second joint member 53. A first gap G1 is present between the portion of the abutting end face of the first joint member 52 which is positioned radially inwardly of the recessed portion 57 and the portion of the abutting end face of the second joint member 53 which is positioned radially inwardly of the ridge 58. A second gap G2 greater than the first gap G1 is present between the portion of the abutting end face of the first joint member 52 which is positioned radially outwardly of the recessed portion 57 and the portion of the abutting end face of the second joint member 53 which is positioned radially outwardly of the ridge 58. When the pipe joint 51 is properly tightened up, the gasket 54 and the ridge 58 of the second joint member 53 are entirely fitted in the recessed portion 57 of the first joint member 52, the outer surface of the ridge 58 of the member 53 is pressed against the inner surface of the recessed portion 57 of the member 52 with the gasket 54 interposed between these surfaces in intimate contact therewith approximately over the entire surface areas, the portion of the abutting end face of the first joint member 52 which is positioned radially inwardly of the recessed portion 57 is in intimate contact with the portion of the abutting end face of the second joint member 53 which is positioned radially inwardly of the ridge 58 approximately over the entire opposed faces thereof, and the portion of the abutting end face of the first joint member 52 which is positioned radially outwardly of the recessed portion 57 is in intimate contact with the portion of the abutting end face of the second joint member 53 which is positioned radially outwardly of the ridge 58 approximately over the entire opposed faces thereof.

Even if the synthetic resin joint members 52, 53 and gasket 54 undergo alterations with time, the first joint member 52 is always biased toward the second joint member 53 by the disk spring 50. This enables the pipe joint 51 of the present embodiment to maintain the specific pressure which greatly influences the performance thereof in preventing fluid leaks.

Figure 9:
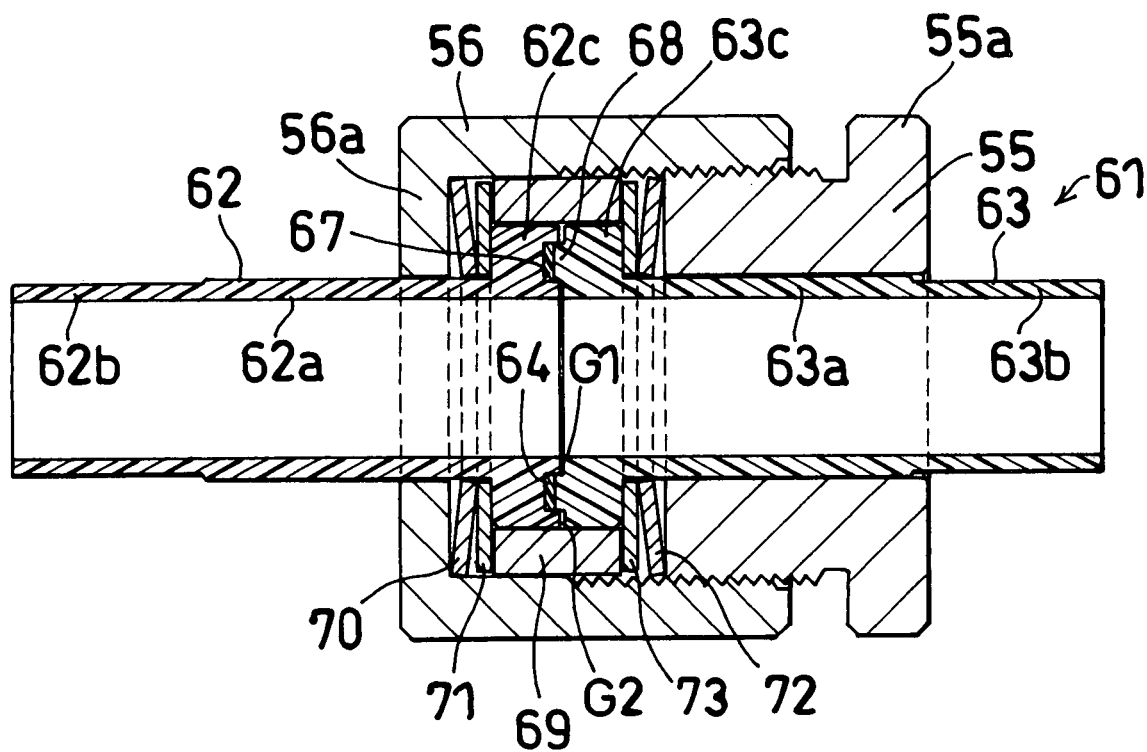
FIG. 9 is a view in longitudinal section showing another embodiment of pipe joint according to the first feature of the invention.

FIG. 9 shows another embodiment of a pipe joint according to the first feature of the invention. With reference to FIG. 9, the pipe joint 61 comprises a first tubular joint member 62 of synthetic resin, a second tubular joint member 63 of synthetic resin, a synthetic resin annular gasket 64 having a rectangular cross section and interposed between abutting portions of the two joint members 62, 63, an annular male screw member 55 fitted around the second joint member 63, and a cap nut 56 fitted around the first joint member 62 and screwed on the male screw member 55.

The joint members 62, 63 are equal in inside diameter, each have a predetermined inside diameter over the entire length, and comprise thick wall portions 62a, 63a closer to the abutting portions, thin wall portions 62b, 63b remote from the abutting portions and flange portions 62c, 63c formed at the abutting ends of the thick wall portions 62a, 63a, respectively.

The first joint member 62 has an annular recessed portion 67 rectangular in cross section and formed in a radially intermediate portion of the abutting end face thereof. The second joint member 63 has an annular ridge 68 rectangular in cross section and formed on a radially intermediate portion of the abutting end face thereof.

The male screw member 55 and the cap nut 56 are made of metal. A flange portion 55a in the form of a hexagonal prism is formed on the male screw member 55 at an end thereof opposite to the abutting portion. The cap nut 56 has a top wall 56a in the form of a bored disk and formed at an end thereof opposite to the abutting portion. The male screw member 55 has an inside diameter approximately equal to the outside diameter of thick wall portion 63a of the second joint member 63. The top wall 56a of the cap nut 56 has an inside diameter approximately equal to the outside diameter of thick wall portion 62a of the first joint member 62.

According to the present embodiment, the outside diameter of the male screw member 55 and the inside diameter of the cap nut 56 are greater than the outside diameter of the flange portions 62c, 63c of the joint members 62, 63, and a clearance is formed inside the cap nut 56 around the flange portions 62c, 63c of the joint members 62, 63. An annular spacer 69 is disposed in this clearance. Provided between the top wall of the cap nut 56, and the flange portion 62c of the first joint member 62 and the spacer 69 are an annular disk spring 70 and a spring washer 71 serving as members for biasing the joint member flange portion 62c toward the second joint member 63, with the spring washer 71 positioned closer to the flange portion 62c and the spacer 69. Also provided between the male screw member 55, and the flange portion 63c of the second joint member 63 and the spacer 69 are an annular disk spring 72 and a spring washer 73 serving as members for biasing the joint member flange portion 63c toward the first joint member 62, with the spring washer 73 positioned closer to the flange portion 63c and the spacer 69. The spacer 69 has an axial length slightly smaller than the sum of the axial lengths of the flange portions 62c, 63c of the two joint members 62, 63.

When the cap nut 56 is tightened on the male screw member 55, the male screw member 55 pushes the flange portion 63c of the second joint member 63 axially inward through the disk spring 72 and the spring washer 73, while the cap nut 56 pushes the flange portion 62c of the first joint member 62 axially inward through the disk spring 70 and the spring washer 71, whereby the two joint members 62, 63 are brought into intimate contact with each other with the gasket 64 interposed therebetween.

The recessed portion 67 of the first joint member 62, the ridge 68 of the second joint member 63 and the gasket 64 are approximately equal in inside diameter. The recessed portion 67 of the first joint member 62, the ridge 68 of the second joint member 63 and the gasket 64 are also approximately equal in outside diameter. The depth of the recessed portion 67 is greater than the amount of projection of the ridge 68, and the thickness of the gasket 64 is smaller than the depth of the recessed portion 67. The depth of the recessed portion 67 is slightly smaller than the sum of the amount of projection of the ridge 68 and the thickness of the gasket 64.

FIG. 9 shows the cap nut 56 as manually tightened up on the male screw member 55. The pipe joint 61 has the same construction as the embodiment shown in FIGS. 1 and 2 except for the spacer 69 and the biasing members 70, 71, 72, 73 so that a detailed description will not be given. When the pipe joint 61 is in the manually tightened state, the gasket 64 is entirely fitted in the recessed portion 67 of the first joint member 62, and pressed against the bottom surface of the recessed portion 67 by the ridge 68 of the second joint member 63. A first gap G1 is present between the portion of the abutting end face of the first joint member 62 which is positioned radially inwardly of the recessed portion 67 and the portion of the abutting end face of the second joint member 63 which is positioned radially inwardly of the ridge 68. A second gap G2 greater than the first gap G1 is present between the portion of the abutting end face of the first joint member 62 which is positioned radially outwardly of the recessed portion 67 and the portion of the abutting end face of the second joint member 63 which is positioned radially outwardly of the ridge 68. When the pipe joint 61 is properly tightened up, the gasket 64 and the ridge 68 of the second joint member 63 are entirely fitted in the recessed portion 67 of the first joint member 62, the outer surface of the ridge 68 of the member 63 is pressed against the inner surface of the recessed portion 67 of the member 62 with the gasket 64 interposed therebetween in intimate contact therewith approximately over the entire areas thereof, the radially inward portion of the first joint member (62) abutting end face is in intimate contact with the radially inward portion of the second joint member (63) abutting end face approximately over the entire opposed faces thereof, and the radially outward portion of the first joint member (62) abutting end face is also in intimate contact with the radially outward portion of the second joint member (63) abutting end face approximately over the entire opposed faces thereof.

Even if the synthetic resin joint members 62, 63 and gasket 64 undergo alterations with time, the first joint member 62 is always biased toward the second joint member 63 by the disk spring 70, and the second joint member 63 is biased toward the first joint member 62 by the disk spring 72 at all times. This enables the pipe joint 61 of the present embodiment to maintain the specific pressure which greatly influences the performance thereof in preventing fluid leaks.

Although the pipe joints shown in FIGS. 8 and 9 have been described as other embodiments of the first feature of the invention, the constructions of these embodiments which are different from the construction shown in FIGS. 1 and 2 can be used for the pipe joints embodying the second and third features of the invention. The spacer 59 or 69 can be dispensed with. A disk spring can be added, for example, to the embodiment shown in FIG. 1. The disk spring 50, or disk springs 70 and 72 can be given an increased diameter by the use of the spacer 59 or 69. Coil springs can of course be used as biasing members in place of the disk springs 50, 70, 72 and spring washers 60, 71, 73.

Figure 10:
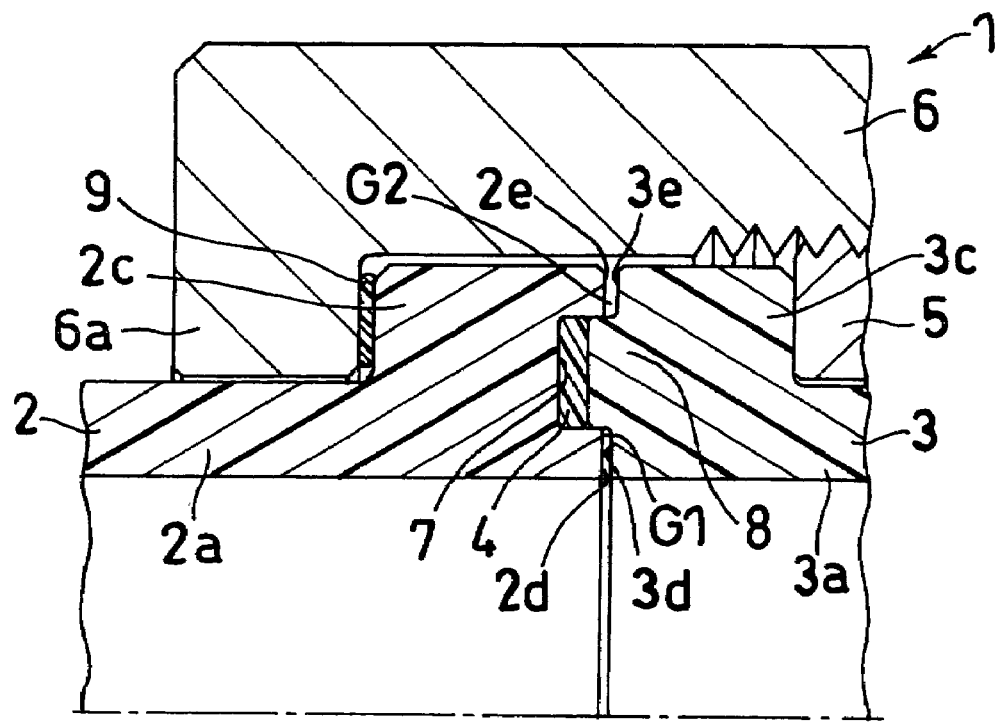
FIG. 10 is a view in longitudinal section showing another embodiment of pipe joint according to the first feature of the invention.

FIG. 10 shows another embodiment of a pipe joint according to the first feature of the invention. With reference to FIG. 10, the pipe joint 1 comprises a first tubular joint member 2 of synthetic resin, a second tubular joint member 3 of synthetic resin, a synthetic resin annular gasket 4 having a rectangular cross section and interposed between abutting portions of the two joint members 2, 3, an annular male screw member 5 fitted around the second joint member 3, a cap nut 6 fitted around the first joint member 2 and screwed on the male screw member 5 and a synthetic resin thrust ring 9 disposed between the inner surface of top wall 6a of the cap nut 6 and the flange portion 2c of the first joint member 2.

This embodiment differs from the first embodiment solely in that the thrust ring 9 is provided in the former. Thus, throughout FIGS. 1, 2 and 10, like parts are designated by like reference numerals and will not be described repeatedly. Incidentally, FIG. 10 is a view which corresponds to FIG. 2(a) and shows the cap nut 6 as manually tightened up on the male screw member 5.

The thrust ring 9 is made from the same material as the gasket 4 or a material having a smaller coefficient of sliding friction than the material, and is equal to or smaller than the gasket 4 in thickness. For example, the thrust ring has about one-half the thickness of the gasket 4. The thrust ring 9 has an inside diameter approximately equal to the inside diameter of the top wall 6a of the cap nut 6, and an outside diameter approximately equal to the outside diameter of the flange portion 2c of the first joint member 2. Although annular, the thrust ring 9 need not always be annular but may be C-shaped.

As the cap nut 6 of the pipe joint 1 of the present embodiment is tightened by rotating, the thrust ring 9 slides in contact with the inner surface of the nut top wall 6a and the side face of the flange portion 2c of the first joint member 2 relative thereto, preventing the first joint member 2 from rotating with the cap nut 6. The same thrust ring 9 as above can be interposed between the forward end face of the male screw member 5 and the second joint member 3.

Figure 11:
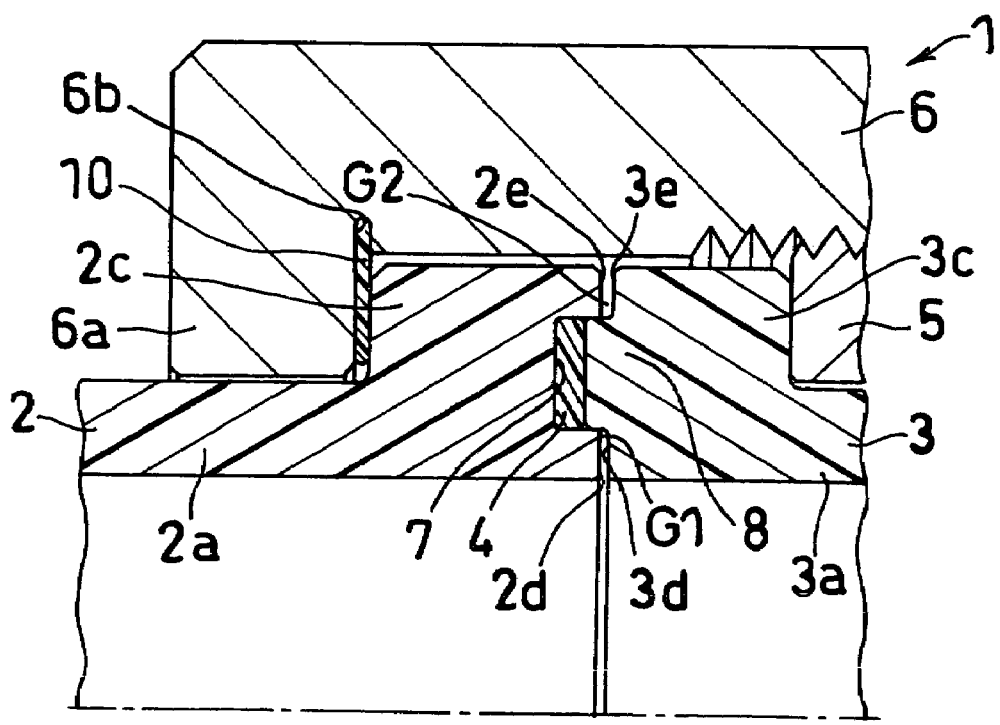
FIG. 11 is a view in longitudinal section showing another embodiment of pipe joint according to the first feature of the invention.

FIG. 11 shows another embodiment of the pipe joint shown in FIG. 10. This pipe joint 1 comprises a first tubular joint member 2 of synthetic resin, a second tubular joint member 3 of synthetic resin, a synthetic resin annular gasket 4 having a rectangular cross section and interposed between abutting portions of the two joint members 2, 3, an annular male screw member 5 fitted around the second joint member 3, a cap nut 6 fitted around the first joint member 2 and screwed on the male screw member 5 and a synthetic resin thrust ring 10 disposed between the inner surface of top wall 6a of the cap nut 6 and the flange portion 2c of the first joint member 2.

This embodiment differs from the first embodiment solely in that the thrust ring 10 is provided in the former and that the cap nut 6 thereof is further machined. Like parts are designated by like reference numerals and will not be described repeatedly. Incidentally, FIG. 11 is a view corresponds to FIG. 2(a) and shows the cap nut 6 as manually tightened up on the male screw member 5.

The thrust ring 10 is made from the same material as the gasket 4 or a material having a smaller coefficient of sliding friction than the material, and is equal to or smaller than the gasket 4 in thickness. For example, the thrust ring has about one-half the thickness of the gasket 4. The thrust ring 10 has an inside diameter approximately equal to the inside diameter of the top wall 6a of the cap nut 6, and an outside diameter greater than the outside diameter of the flange portion 2c of the first joint member 2. Although annular, the thrust ring 10 need not always be perfectly annular but may be C-shaped.

Since the thrust ring 10 is greater than the flange portion 2c of the first joint member 2 in outside diameter, the cap nut 6 has formed in its inner periphery an annular recess 6b extending along the inner surface of the top wall 6a for accommodating the outer peripheral edge of the thrust ring 10. The annular recess 6b has an outside diameter approximately equal to the outside diameter of the thrust ring 10. The thrust ring 10, which is made of synthetic resin, has some elasticity, and the outer peripheral edge of the ring can be made to extend along the inner surface of the nut top wall 6a and fitted into the recess 6b. This obviates the likelihood that the worker will forget to fit the ring 10 into place, further eliminating the likelihood of the thrust ring 10 slipping off when the cap nut 6 is removed.

As the cap nut 6 of the pipe joint 1 of the present embodiment is tightened by rotating, the thrust ring 10 slides in contact with the inner surface of the nut top wall 6a and the side face of the flange portion 2c of the first joint member 2 relative thereto, preventing the first joint member 2 from rotating with the cap nut 6. The same thrust ring 9 as shown in FIG. 10 can be interposed between the forward end face of the male screw member 5 and the second joint member 3.

Although the pipe joints shown in FIGS. 9 and 10 have been described as other embodiments of the first feature of the invention, the constructions of these embodiments which are different from the construction shown in FIGS. 1 and 2 can be used for the pipe joints embodying the second and third features of the invention.

INDUSTRIAL APPLICABILITY

The pipe joint of the present invention is suitable for use with fluids which are highly corrosive to metals and used, for example, in fluid control devices in semiconductor manufacturing apparatus.

The invention claimed is:

1. A pipe joint comprising
a first and a second tubular joint member of synthetic resin,
a synthetic resin gasket interposed between abutting portions of the joint members and screw means for joining the joint members,
the pipe joint being characterized in that the first joint member is provided in an abutting end face thereof with an annular recessed portion having an opening remaining therein with the gasket entirely fitted therein,
the second joint member being provided with an annular ridge on an abutting end face thereof,
the ridge being fitted in the opening of the recessed portion with the gasket fitted in the recessed portion,
an outer surface of the ridge of the second joint member being pressed against an inner surface of the recessed portion of the first joint member with the gasket interposed between the surfaces in intimate contact therewith approximately over the entire surface areas when the pipe joint is properly tightened up,
a portion of the abutting end face of the first joint member positioned radially inwardly of the recessed portion being then in intimate contact with a portion of the abutting end face of the second joint member positioned radially inwardly of the ridge approximately over the entire surface areas thereof,
a portion of the abutting end face of the first joint member positioned radially outwardly of the recessed portion being then in intimate contact with a portion of the abutting end face of the second joint member positioned radially outwardly of the ridge approximately over the entire surface areas thereof,
wherein when the pipe joint is manually tightened up, a first gap is present between the portion of the abutting end face of the first joint member positioned radially inwardly of the recessed portion and the portion of the abutting end face of the second joint member positioned radially inwardly of the ridge, and a second gap greater than the first gap is present between the portion of the abutting end face of the first joint member positioned radially outwardly of the recessed portion and the portion of the abutting end face of the second joint member positioned radially outwardly of the ridge,
wherein each of the joint members is provided at the abutting end face thereof with a flange portion, and the screw means comprises an annular male screw member having a forward end face in bearing contact with the flange portion of one of the joint members, and a cap nut fitted around the other joint member and having a top wall in bearing contact with the flange portion of said other joint member, the cap nut being screwed on the male screw member, wherein
an annular clearance is formed inside the cap nut around the flange portions of the joint members and has an annular spacer disposed therein, and at least one of a space between the cap nut top wall and the spacer and a space between the male screw member and the spacer has provided therein a biasing member for biasing one of the joint members toward the other joint member.

2. A pipe joint comprising
a first and a second tubular joint member of synthetic resin, and screw means for joining the joint members,
the pipe joint being characterized in that the first joint member is provided with an annular recessed portion formed between a portion of an abutting end face positioned radially inwardly and a portion of the abutting end face positioned radially outwardly,
the second joint member being provided with an annular ridge on an abutting end face thereof,
the ridge of the second joint member being fitted in the recessed portion of the first joint member, with an outer surface of the ridge in intimate contact with an inner surface of the recessed portion approximately over the entire surface areas when the pipe joint is properly tightened up,
the portion of the abutting end face of the first joint member positioned radially inwardly of the recessed portion being then in intimate contact with a portion of the abutting end face of the second joint member positioned radially inwardly of the ridge approximately over the entire surface areas thereof,
the portion of the abutting end face of the first joint member positioned radially outwardly of the recessed portion being then in intimate contact with a portion of the abutting end face of the second joint member positioned radially outwardly of the ridge approximately over the entire surface areas thereof,
wherein when the pipe joint is manually tightened up, a first gap is present between the portion of the abutting end face of the first joint member positioned radially inwardly of the recessed portion and the portion of the abutting end face of the second joint member positioned radially inwardly of the ridge, and a second gap greater than the first gap is present between the portion of the abutting end face of the first joint member positioned radially outwardly of the recessed portion and the portion of the abutting end face of the second joint member positioned radially outwardly of the ridge,
wherein each of the joint members is provided at the abutting end face thereof with a flange portion, and the screw means comprises an annular male screw member having a forward end face in bearing contact with the flange portion of one of the joint members, and a cap nut fitted around the other joint member and having a top wall in bearing contact with the flange portion of said other joint member, the cap nut being screwed on the male screw member, wherein
an annular clearance is formed inside the cap nut around the flange portions of the joint members and has an annular spacer disposed therein, and at least one of a space between the cap nut top wall and the spacer and a space between the male screw member and the spacer has provided therein a biasing member for biasing one of the joint members toward the other joint member.

3. A pipe joint comprising
a first and a second tubular joint member of synthetic resin,
a synthetic resin gasket interposed between abutting portions of the joint members and screw means for joining the joint members,
the pipe joint being characterized in that each of the joint members is provided in an abutting end face thereof with an annular recessed portion for forming a portion for accommodating the gasket therein when the joint members are butted against each other,
the gasket being in intimate contact with an inner surface of the recessed portion of the first joint member approximately over the entire area thereof when the pipe joint is properly tightened up,
a surface portion of the gasket exposed from the same recessed portion being then in intimate contact with an inner surface of the recessed portion of the second joint member approximately over the entire area thereof,
a portion of the abutting end face of the first joint member positioned radially inwardly of the recessed portion thereof being then in intimate contact with a portion of the abutting end face of the second joint member positioned radially inwardly of the recessed portion thereof approximately over the entire surface areas thereof,
a portion of the abutting end face of the first joint member positioned radially outwardly of the recessed portion thereof being then in intimate contact with a portion of the abutting end face of the second joint member positioned radially outwardly of the recessed portion thereof approximately over the entire surface areas thereof,
wherein when the pipe joint is manually tightened up, a first gap is present between the portion of the abutting end face of the first joint member positioned radially inwardly of the recessed portion thereof and the portion of the abutting end face of the second joint member positioned radially inwardly of the recessed portion thereof, and a second gap greater than the first gap is present between the portion of the abutting end face of the first joint member positioned radially outwardly of the recessed portion thereof and the portion of the abutting end face of the second joint member positioned radially outwardly of the recessed portion thereof,
wherein each of the joint members is provided at the abutting end face thereof with a flange portion, and the screw means comprises an annular male screw member having a forward end face in bearing contact with the flange portion of one of the joint members, and a cap nut fitted around the other joint member and having a top wall in bearing contact with the flange portion of said other joint member, the cap nut being screwed on the male screw member, wherein
an annular clearance is formed inside the cap nut around the flange portions of the joint members and has an annular spacer disposed therein, and at least one of a space between the cap nut top wall and the spacer and a space between the male screw member and the spacer has provided therein a biasing member for biasing one of the joint members toward the other joint member.

4. A pipe joint according to one of claims 1 to 3 wherein at least one of a space between the male screw member and the flange portion of said one joint member and a space between the top wall of the cap nut and the flange portion of said other joint member has disposed therein a biasing member for biasing one of the joint members toward the other joint member.

5. A pipe joint comprising
a first and a second tubular joint member of synthetic resin,
a synthetic resin gasket interposed between abutting portions of the joint members and screw means for joining the joint members,
the pipe joint being characterized in that each of the joint members is provided in an abutting end face thereof with an annular recessed portion for forming a portion for accommodating the gasket therein when the joint members are butted against each other, the gasket being in intimate contact with an inner surface of the recessed portion of the first joint member approximately over the entire area thereof when the pipe joint is properly tightened up, a surface portion of the gasket exposed from the same recessed portion being then in intimate contact with an inner surface of the recessed portion of the second joint member approximately over the entire area thereof, a portion of the abutting end face of the first joint member positioned radially inwardly of the recessed portion thereof being then in intimate contact with a portion of the abutting end face of the second joint member positioned radially inwardly of the recessed portion thereof approximately over the entire surface areas thereof, a portion of the abutting end face of the first joint member positioned radially outwardly of the recessed portion thereof being then in intimate contact with a portion of the abutting end face of the second joint member positioned radially outwardly of the recessed portion thereof approximately over the entire surface areas thereof, characterized in that the portion of the abutting end face of the first joint member positioned radially inwardly of the recessed portion thereof axially projects beyond the radially outward portion thereof, the portion of the abutting end face of the second joint member radially inward of the recessed portion thereof axially projecting beyond the radially outward portion thereof.

6. A pipe joint comprising a first and a second tubular joint member of synthetic resin, a synthetic resin gasket interposed between abutting portions of the joint members and screw means for joining the joint members, the pipe joint being characterized in that each of the joint members is provided in an abutting end face thereof with an annular recessed portion for forming a portion for accommodating the gasket therein when the joint members are butted against each other, the gasket being in intimate contact with an inner surface of the recessed portion of the first joint member approximately over the entire area thereof when the pipe joint is properly tightened up, a surface portion of the gasket exposed from the same recessed portion being then in intimate contact with an inner surface of the recessed portion of the second joint member approximately over the entire area thereof, a portion of the abutting end face of the first joint member positioned radially inwardly of the recessed portion thereof being then in intimate contact with a portion of the abutting end face of the second joint member positioned radially inwardly of the recessed portion thereof approximately over the entire surface areas thereof, a portion of the abutting end face of the first joint member positioned radially outwardly of the recessed portion thereof being then in intimate contact with a portion of the abutting end face of the second joint member positioned radially outwardly of the recessed portion thereof approximately over the entire surface areas thereof, characterized in that the portion of the abutting end face of the first joint member positioned radially inwardly of the recessed portion thereof being flush with the bottom surface of the recessed portion thereof, the radially outward portion of the first joint member axially projecting beyond the bottom surface of the recessed portion thereof, the portion of the abutting end face of the second joint member radially inward of the recessed portion thereof axially projecting beyond the bottom surface of the recessed portion thereof, the radially outward portion of the second joint member being axially recessed from the bottom surface of the recessed portion thereof.

7. A pipe joint comprising a first and a second tubular joint member of synthetic resin, a synthetic resin gasket interposed between abutting portions of the joint members and screw means for joining the joint members, the pipe joint being characterized in that each of the joint members is provided in an abutting end face thereof with an annular recessed portion for forming a portion for accommodating the gasket therein when the joint members are butted against each other, the gasket being in intimate contact with an inner surface of the recessed portion of the first joint member approximately over the entire area thereof when the pipe joint is properly tightened up, a surface portion of the gasket exposed from the same recessed portion being then in intimate contact with an inner surface of the recessed portion of the second joint member approximately over the entire area thereof, a portion of the abutting end face of the first joint member positioned radially inwardly of the recessed portion thereof being then in intimate contact with a portion of the abutting end face of is the second joint member positioned radially inwardly of the recessed portion thereof approximately over the entire surface areas thereof, a portion of the abutting end face of the first joint member positioned radially outwardly of the recessed portion thereof being then in intimate contact with a portion of the abutting end face of the second joint member positioned radially outwardly of the recessed portion thereof approximately over the entire surface areas thereof, characterized in that the portion of the abutting end face of the first joint member positioned radially inwardly of the recessed portion thereof is recessed from the bottom surface of the recessed portion thereof, the radially outward portion of the first joint member axially projecting beyond the bottom surface of the recessed portion thereof, the portion of the abutting end face of the second joint member radially inward of the recessed portion thereof axially projecting beyond the bottom surface of the recessed portion thereof, the radially outward portion of the second joint member being axially recessed from the bottom surface of the recessed portion thereof.

8. A pipe joint according to any one of claims 5 to 7 wherein when the pipe joint is manually tightened up, a first gap is present between the portion of the abutting end face of the first joint member positioned radially inwardly of the recessed portion thereof and the portion of the abutting end face of the second joint member positioned radially inwardly of the recessed portion thereof, and a second gap greater than the first gap is present between the portion of the abutting end face of the first joint member positioned radially outwardly of the recessed portion thereof and the portion of the abutting end face of the second joint member positioned radially outwardly of the recessed portion thereof.

9. A pipe joint according to any one of claims 5 to 7 wherein each of the joint members is provided at the abutting end face thereof with a flange portion, and the screw means comprises an annular male screw member having a forward end face in bearing contact with the flange portion of one of the joint members, and a cap nut fitted around the other joint member and having a top wall in bearing contact with the flange portion of said other joint member, the cap nut being screwed on the male screw member.

10. A pipe joint according to claim 9 wherein
at least one of a space between the male screw member and the flange portion of said one joint member and a space between the top wall of the cap nut and the flange portion of said other joint member has disposed therein a biasing member for biasing one of the joint members toward the other joint member.

11. A pipe joint according to claim 9 wherein
an annular clearance is formed inside the cap nut around the flange portions of the joint members and has an annular spacer disposed therein, and at least one of a space between the cap nut top wall and the spacer and a space between the male screw member and the spacer has provided therein a biasing member for biasing one of the joint members toward the other joint member.

12. A pipe joint according to claim 9 wherein
a synthetic resin thrust ring is interposed between the cap nut top wall and the flange portion of the joint member.

13. A pipe joint according to claim 12 wherein
the thrust ring has an outside diameter larger than the inside diameter of the cap nut, and the cap nut has an annular recess formed in an inner periphery thereof for accommodating an outer peripheral edge of the thrust ring.

14. A pipe joint comprising
a first and a second tubular joint member of synthetic resin,
a synthetic resin gasket interposed between abutting portions of the joint members and screw means for joining the joint members,
the pipe joint being characterized in that the first joint member is provided in an abutting end face thereof with an annular recessed portion having an opening remaining therein with the gasket entirely fitted therein,
the second joint member being provided with an annular ridge on an abutting end face thereof,
the ridge being fitted in the opening of the recessed portion with the gasket fitted in the recessed portion,
an outer surface of the ridge of the second joint member being pressed against an inner surface of the recessed portion of the first joint member with the gasket interposed between the surfaces in intimate contact therewith approximately over the entire surface areas when the pipe joint is properly tightened up,
a portion of the abutting end face of the first joint member positioned radially inwardly of the recessed portion being then in intimate contact with a portion of the abutting end face of the second joint member positioned radially inwardly of the ridge approximately over the entire surface areas thereof,
a portion of the abutting end face of the first joint member positioned radially outwardly of the recessed portion being then in intimate contact with a portion of the abutting end face of the second joint member positioned radially outwardly of the ridge approximately over the entire surface areas thereof,
wherein each of the joint members is provided at the abutting end face thereof with a flange portion, and
the screw means comprises an annular male screw member having a forward end face in bearing contact with the flange portion of one of the joint members, and a cap nut fitted around the other joint member and having a top wall in bearing contact with the flange portion of said other joint member,
the cap nut being screwed on the male screw member, wherein
an annular clearance is formed inside the cap nut around the flange portions of the joint members and has an annular spacer disposed therein, and at least one of a space between the cap nut top wall and the spacer and a space between the male screw member and the spacer has provided therein a biasing member for biasing one of the joint members toward the other joint member.

15. A pipe joint comprising
a first and a second tubular joint member of synthetic resin,
a synthetic resin gasket interposed between abutting portions of the joint members and screw means for joining the joint members,
the pipe joint being characterized in that the first joint member is provided in an abutting end face thereof with an annular recessed portion having an opening remaining therein with the gasket entirely fitted therein,
the second joint member being provided with an annular ridge on an abutting end face thereof,
the ridge being fitted in the opening of the recessed portion with the gasket fitted in the recessed portion,
an outer surface of the ridge of the second joint member being pressed against an inner surface of the recessed portion of the first joint member with the gasket interposed between the surfaces in intimate contact therewith approximately over the entire surface areas when the pipe joint is properly tightened up,
a portion of the abutting end face of the first joint member positioned radially inwardly of the recessed portion being then in intimate contact with a portion of the abutting end face of the second joint member positioned radially inwardly of the ridge approximately over the entire surface areas thereof,
a portion of the abutting end face of the first joint member positioned radially outwardly of the recessed portion being then in intimate contact with a portion of the abutting end face of the second joint member positioned radially outwardly of the ridge approximately over the entire surface areas thereof,
wherein when the pipe joint is manually tightened up, a first gap is present between the portion of the abutting end face of the first joint member positioned radially inwardly of the recessed portion and the portion of the abutting end face of the second joint member positioned radially inwardly of the ridge, and a second gap greater than the first gap is present between the portion of the abutting end face of the first joint member positioned radially outwardly of the recessed portion and the portion of the abutting end face of the second joint member positioned radially outwardly of the ridge,
wherein each of the joint members is provided at the abutting end face thereof with a flange portion, and the screw means comprises an annular male screw member having a forward end face in bearing contact with the flange portion of one of the joint members, and a cap nut fitted around the other joint member and having a top wall in beating contact with the flange portion of said other joint member, the cap nut being screwed on the male screw member, wherein
a synthetic resin thrust ring is interposed between the cap nut top wall and the flange portion of the joint member, wherein the thrust ring has an outside diameter larger than an inside diameter of the cap nut, and the cap nut has an annular recess formed in an inner periphery thereof for accommodating an outer peripheral edge of the thrust ring.

16. A pipe joint comprising
a first and a second tubular joint member of synthetic resin, and screw means for joining the joint members,
the pipe joint being characterized in that the first joint member is provided with an annular recessed portion formed between a portion of an abutting end face positioned radially inwardly and a portion of the abutting end face positioned radially outwardly,
the second joint member being provided with an annular ridge on an abutting end face thereof
the ridge of the second joint member being fitted in the recessed portion of the first joint member, with an outer surface of the ridge in intimate contact with an inner surface of the recessed portion approximately over the entire surface areas when the pipe joint is properly tightened up,
the portion of the abutting end face of the first joint member positioned radially inwardly of the recessed portion being then in intimate contact with a portion of the abutting end face of the second joint member positioned radially inwardly of the ridge approximately over the entire surface areas thereof,
the portion of the abutting end face of the first joint member positioned radially outwardly of the recessed portion being then in intimate contact with a portion of the abutting end face of the second joint member positioned radially outwardly of the ridge approximately over the entire surface areas thereof,
wherein when the pipe joint is manually tightened up, a first gap is present between the portion of the abutting end face of the first joint member positioned radially inwardly of the recessed portion and the portion of the abutting end face of the second joint member positioned radially inwardly of the ridge, and a second gap greater than the first gap is present between the portion of the abutting end face of the first joint member positioned radially outwardly of the recessed portion and the portion of the abutting end face of the second joint member positioned radially outwardly of the ridge,
wherein each of the joint members is provided at the abutting end face thereof with a flange portion, and the screw means comprises an annular male screw member having a forward end face in bearing contact with the flange portion of one of the joint members, and a cap nut fitted around the other joint member and having a top wall in bearing contact with the flange portion of said other joint member, the cap nut being screwed on the male screw member, wherein
a synthetic resin thrust ring is interposed between the cap nut top wall and the flange portion of the joint member, wherein
the thrust ring has an outside diameter larger than an inside diameter of the cap nut, and the cap nut has an annular recess formed in an inner periphery thereof for accommodating an outer peripheral edge of the thrust ring.

17. A pipe joint comprising
a first and a second tubular joint member of synthetic resin,
a synthetic resin gasket interposed between abutting portions of the joint members and screw means for joining the joint members,
the pipe joint being characterized in that each of the joint members is provided in an abutting end face thereof with an annular recessed portion for forming a portion for accommodating the gasket therein when the joint members are butted against each other,
the gasket being in intimate contact with an inner surface of the recessed portion of the first joint member approximately over the entire area thereof when the pipe joint is properly tightened up,
a surface portion of the gasket exposed from the same recessed portion being then in intimate contact with an inner surface of the recessed portion of the second joint member approximately over the entire area thereof,
a portion of the abutting end face of the first joint member positioned radially inwardly of the recessed portion thereof being then in intimate contact with a portion of the abutting end face of the second joint member positioned radially inwardly of the recessed portion thereof approximately over the entire surface areas thereof,
a portion of the abutting end face of the first joint member positioned radially outwardly of the recessed portion thereof being then in intimate contact with a portion of the abutting end face of the second joint member positioned radially outwardly of the recessed portion thereof approximately over the entire surface areas thereof,
wherein when the pipe joint is manually tightened up, a first gap is present between the portion of the abutting end face of the first joint member positioned radially inwardly of the recessed portion thereof and the portion of the abutting end face of the second joint member positioned radially inwardly of the recessed portion thereof, and a second gap greater than the first gap is present between the portion of the abutting end face of the first joint member positioned radially outwardly of the recessed portion thereof and the portion of the abutting end face of the second joint member positioned radially outwardly of the recessed portion thereof,
wherein each of the joint members is provided at the abutting end face thereof with a flange portion, and the screw means comprises an annular male screw member having a forward end face in bearing contact with the flange portion of one of the joint members, and a cap nut fitted around the other joint member and having a top wall in bearing contact with the flange portion of said other joint member, the cap nut being screwed on the male screw member, wherein
a synthetic resin thrust ring is interposed between the cap nut top wall and the flange portion of the joint member, wherein
the thrust ring has an outside diameter larger than an inside diameter of the cap nut, and the cap nut has an annular recess formed in an inner periphery thereof for accommodating an outer peripheral edge of the thrust ring.

18. A pipe joint comprising
a first and a second tubular joint member of synthetic resin,
a synthetic resin gasket interposed between abutting portions of the joint members and screw means for joining the joint members,
the pipe joint being characterized in that the first joint member is provided in an abutting end face thereof with an annular recessed portion having an opening remaining therein with the gasket entirely fitted therein,
the second joint member being provided with an annular ridge on an abutting end face thereof,
the ridge being fitted in the opening of the recessed portion with the gasket fitted in the recessed portion,
an outer surface of the ridge of the second joint member being pressed against an inner surface of the recessed portion of the first joint member with the gasket interposed between the surfaces in intimate contact therewith approximately over the entire surface areas when the pipe joint is properly tightened up, a portion of the abutting end face of the first joint member positioned radially inwardly of the recessed portion being then in intimate contact with a portion of the abutting end face of the second joint member positioned radially inwardly of the ridge approximately over the entire surface areas thereof, a portion of the abutting end face of the first joint member positioned radially outwardly of the recessed portion being then in intimate contact with a portion of the abutting end face of the second joint member positioned radially outwardly of the ridge approximately over the entire surface areas thereof, wherein each of the joint members is provided at the abutting end face thereof with a flange portion, and the screw means comprises an annular male screw member having a forward end face in bearing contact with the flange portion of one of the joint members, and a cap nut fitted around the other joint member and having a top wall in bearing contact with the flange portion of said other joint member, the cap nut being screwed on the male screw member, wherein a synthetic resin thrust ring is interposed between the cap nut top wall and the flange portion of the joint member, wherein the thrust ring has an outside diameter larger than an inside diameter of the cap nut, and the cap nut has an annular recess formed in an inner periphery thereof for accommodating an outer peripheral edge of the thrust ring.

* * * * *